United States Patent
Yamamoto et al.

(12)

(10) Patent No.: US 6,230,136 B1
(45) Date of Patent: May 8, 2001

(54) VOICE CONTROL SYSTEM AND NAVIGATION SYSTEM USING SAME

(75) Inventors: Eiji Yamamoto; Kazuhiro Tsubota, both of Kanagawa (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/203,818

(22) Filed: Dec. 2, 1998

(30) Foreign Application Priority Data

Dec. 4, 1997 (JP) .................................... 9-334671

(51) Int. Cl.⁷ .................................... G10L 15/22
(52) U.S. Cl. .......................... 704/275; 704/212
(58) Field of Search .................. 704/275, 270, 704/200, 500, 507, 501, 212, 205, 206

(56) References Cited

U.S. PATENT DOCUMENTS 5,809,466 * 9/1998 Hewitt et al. ........................ 704/258

FOREIGN PATENT DOCUMENTS 59103423    6/1984 (JP) .............................. H03K/13/24

* cited by examiner

Primary Examiner—Richemond Dorvil
(74) Attorney, Agent, or Firm—Pearne & Gordon LLP

(57) ABSTRACT

To decode voice data coded in a coding system on a specific standard (for example, ADPCM or a different standard), the voice data is previously sorted by a data sorter 102 and is stored in a second data storage 103. Voice data read from a third data storage 105 is decoded by a decoder 107 and is converted from parallel data into serial data by a parallel/serial data converter 109. The resultant data is transferred to a D/A converter, whereby the voice data coded on one standard and the voice data coded on a different standard can be decoded and transferred to the D/A converter by circuit change on a small scale without the need for a separate voice control system for each coding system.

25 Claims, 21 Drawing Sheets

FIG. 6

| | MSB 15 | | LSB 0 |
|---|---|---|---|
| ① | | smp0 | |
| ② | | smp1 | |
| ③ | | smp2 | |
| ④ | | smp3 | |
| ⑤ | | smp4 | |
| ⑥ | | smp5 | |
| ⑦ | | smp6 | |
| ⑧ | | smp7 | |
| ⑨ | | smp8 | |
| ⑩ | | smp9 | |
| ⑪ | | smp10 | |
| ⑫ | | smp11 | |
| ⑬ | | smp12 | |
| ⑭ | | smp13 | |
| ⑮ | | smp14 | |
| ⑯ | | smp15 | |

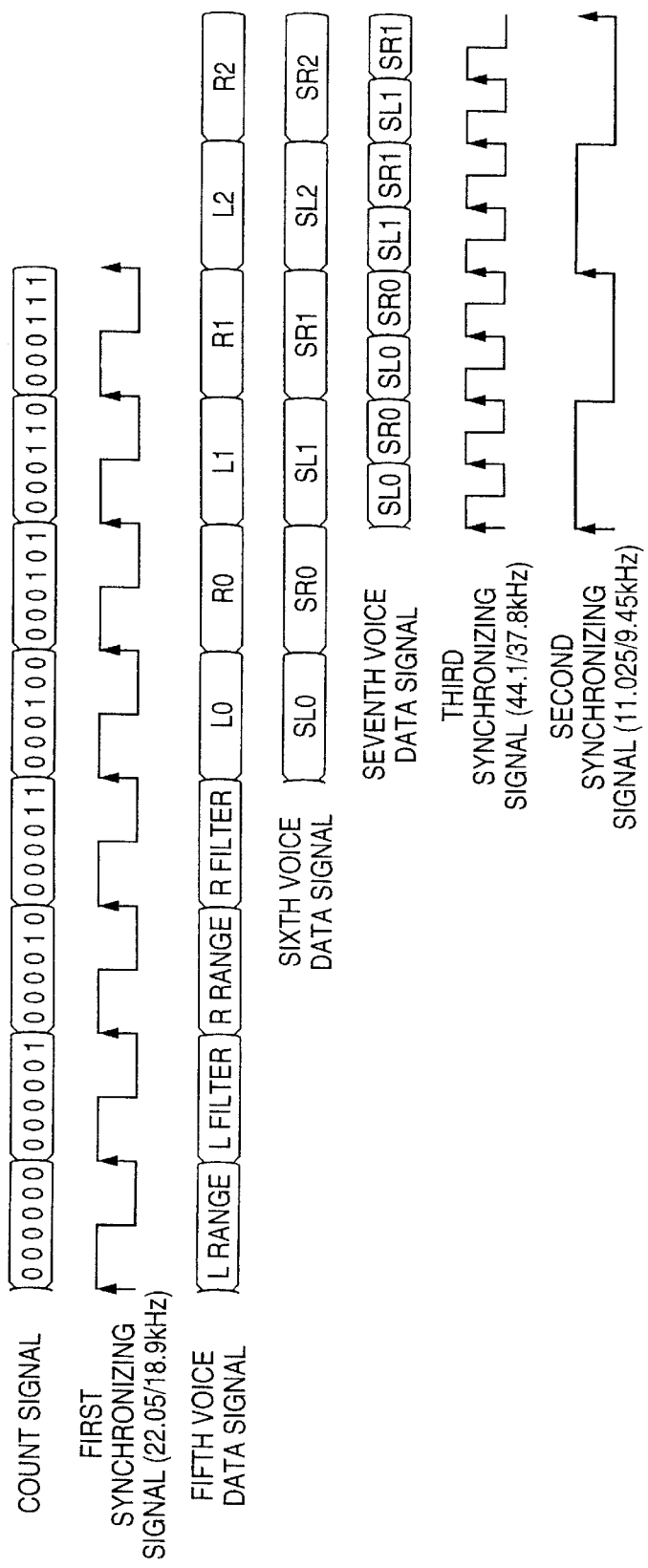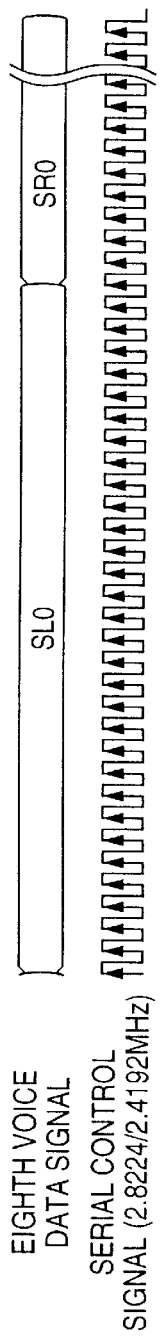

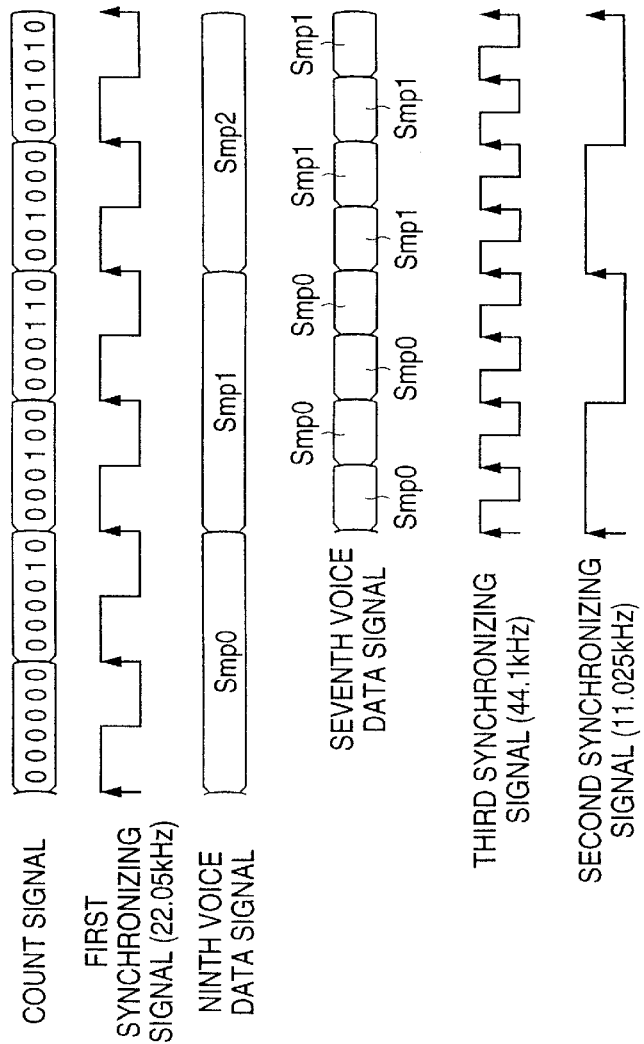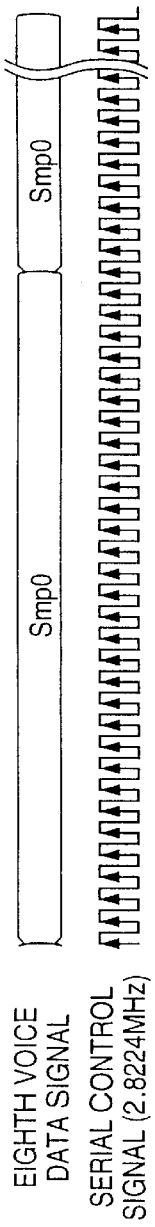

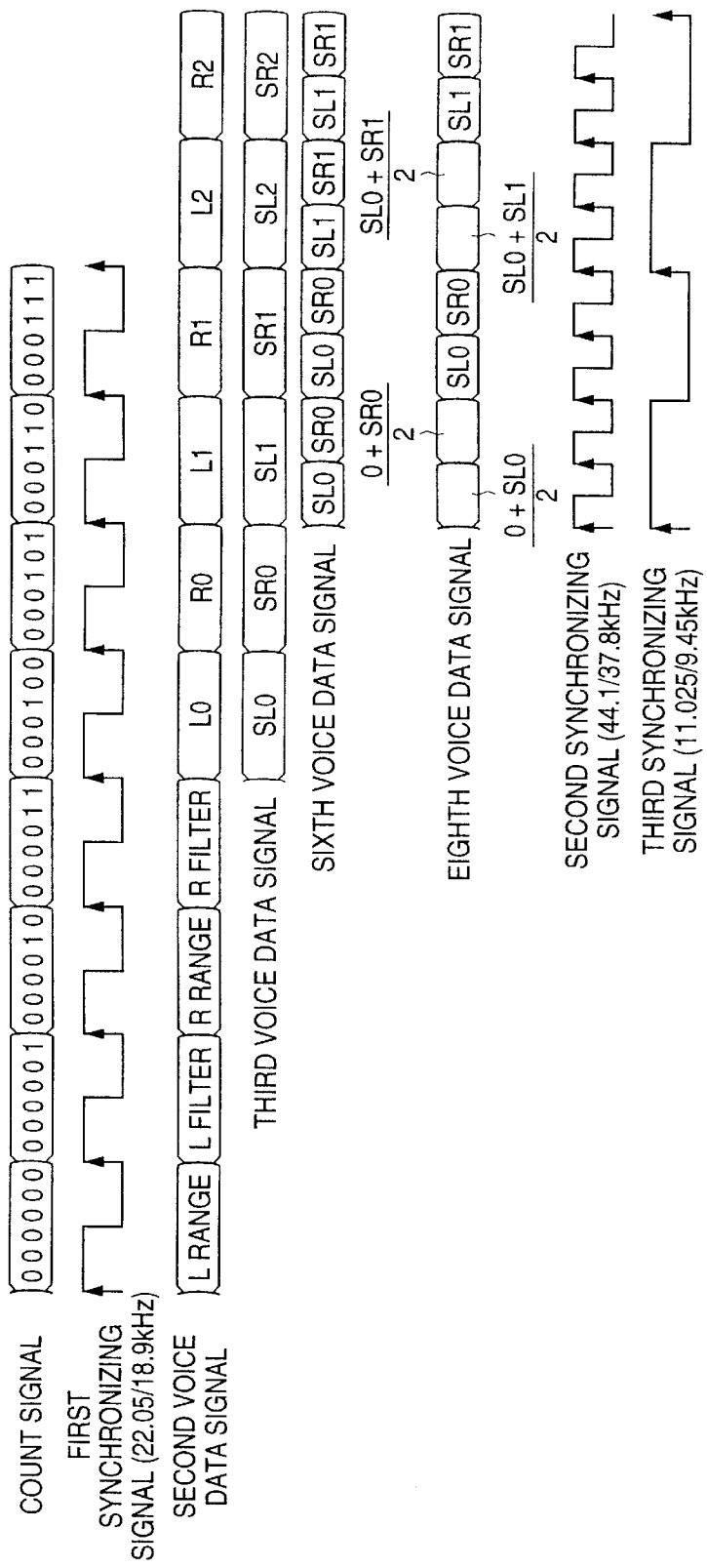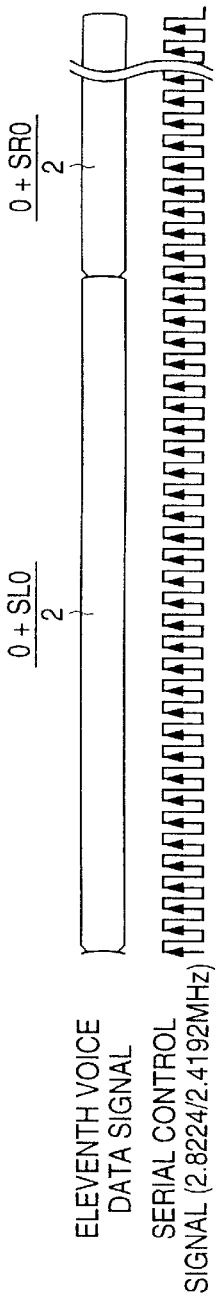

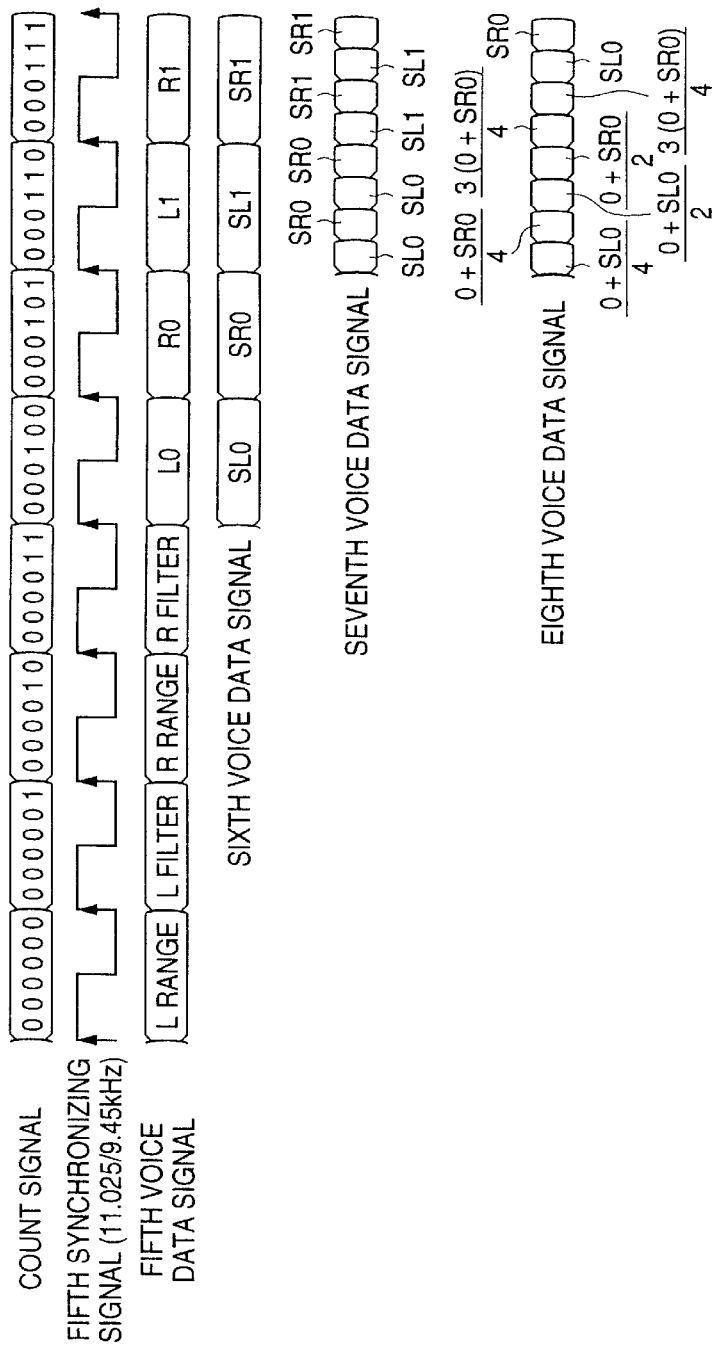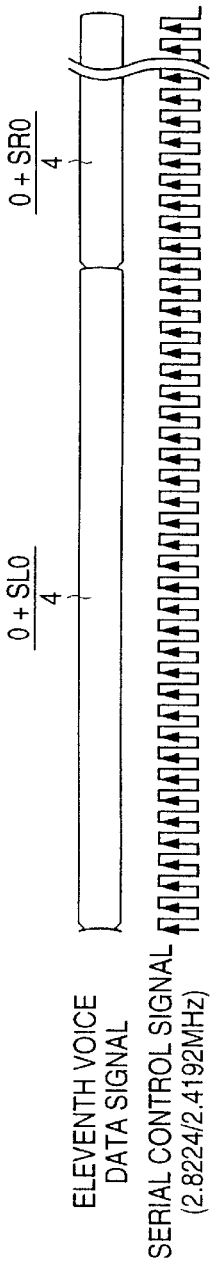

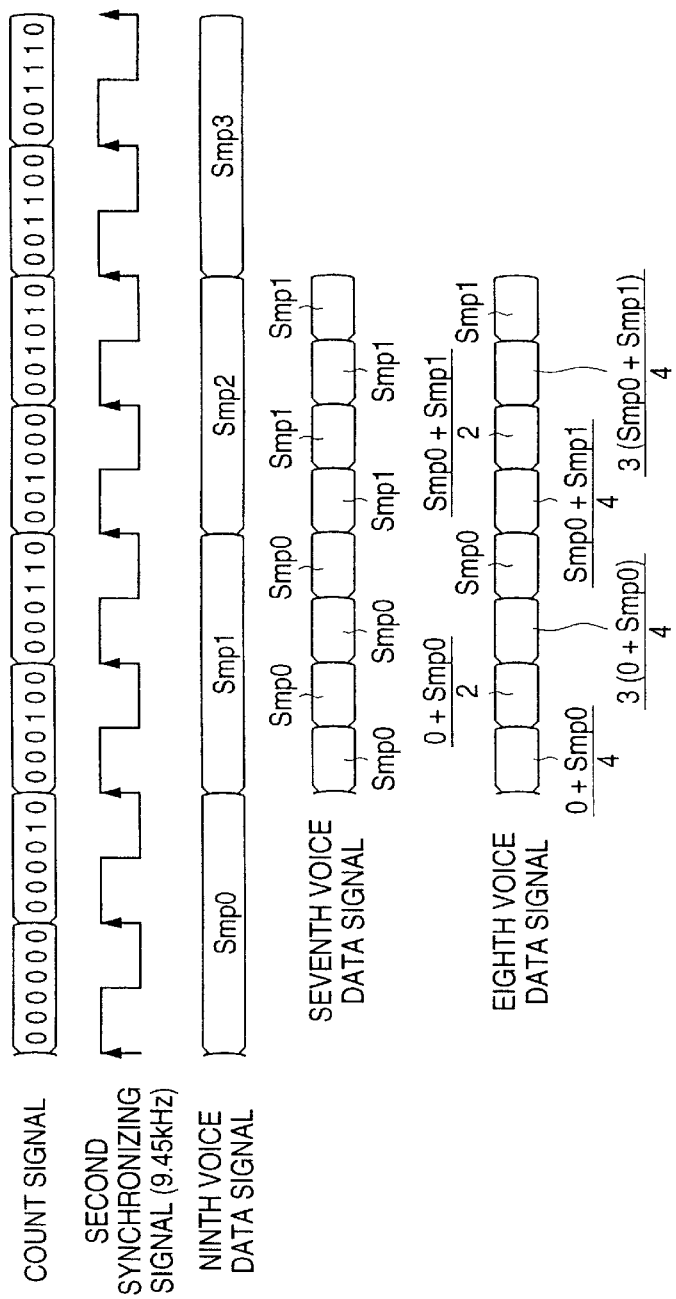
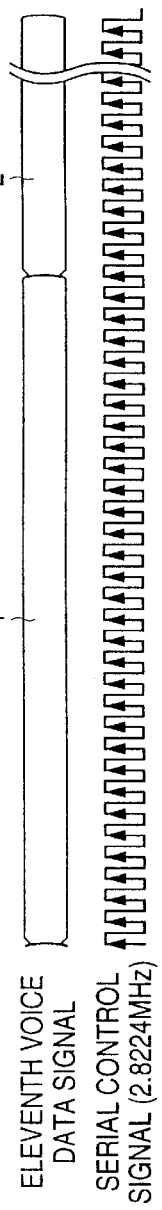

FIG. 22
PRIOR ART

| | MSB | I | II | III | IV | LSB |
|---|---|---|---|---|---|---|
| | 15 | | 12,11 | 8,7 | 4,3 | 0 |

| | L RANGE | L FILTER | R RANGE | R FILTER |
|---|---|---|---|---|
| ① | L RANGE | L FILTER | R RANGE | R FILTER |
| ② | L0 | L1 | R0 | R1 |
| ③ | L2 | L3 | R2 | R3 |
| ④ | L4 | L5 | R4 | R5 |
| ⑤ | L6 | L7 | R6 | R7 |
| ⑥ | L8 | L9 | R8 | R9 |
| ⑦ | L10 | L11 | R10 | R11 |
| ⑧ | L12 | L13 | R12 | R13 |
| ⑨ | L14 | L15 | R14 | R15 |
| ⑩ | L16 | L17 | R16 | R17 |
| ⑪ | L18 | L19 | R18 | R19 |
| ⑫ | L20 | L21 | R20 | R21 |
| ⑬ | L22 | L23 | R22 | R23 |
| ⑭ | L24 | L25 | R24 | R25 |
| ⑮ | L26 | L27 | R26 | R27 |
| ⑯ | L28 | L29 | R28 | R29 |

FIG. 25
PRIOR ART

| | MSB | I | II | III | IV | LSB |
|---|---|---|---|---|---|---|
| | 15 | 12,11 | 8,7 | 4,3 | 0 | |

| | L RANGE | L FILTER | R RANGE | R FILTER |
|---|---|---|---|---|
| ① | L RANGE | L FILTER | R RANGE | R FILTER |
| ② | L0 | L1 | R0 | R1 |
| ③ | L2 | L3 | R2 | R3 |
| ④ | L4 | L5 | R4 | R5 |
| ⑤ | L6 | L7 | R6 | R7 |
| ⑥ | L8 | L9 | R8 | R9 |
| ⑦ | L10 | L11 | R10 | R11 |
| ⑧ | L12 | L13 | R12 | R13 |
| ⑨ | L14 | L15 | R14 | R15 |
| ⑩ | L16 | L17 | R16 | R17 |
| ⑪ | L18 | L19 | R18 | R19 |
| ⑫ | L20 | L21 | R20 | R21 |
| ⑬ | L22 | L23 | R22 | R23 |
| ⑭ | L24 | L25 | R24 | R25 |
| ⑮ | L26 | L27 | R26 | R27 |
| ⑯ | | | | |

FIG. 26

| | 16 BITS | | |
|---|---|---|---|
| MSB | | | LSB |
| SP$^0$ (L RANGE) ① | SP$^0$ (L FILTER) ② | SP$^1$ (R RANGE) ③ | SP$^1$ (R FILTER) ④ |
| SD$^0{}_0$ (L0) ⑤ | SD$^0{}_1$ (L1) ⑥ | SD$^0{}_0$ (R0) ⑦ | SD$^1{}_1$ (R1) ⑧ |
| SD$^0{}_2$ (L2) ⑨ | SD$^0{}_3$ (L3) ⑩ | SD$^0{}_2$ (R2) ⑪ | SD$^0{}_3$ (R3) ⑫ |
| SD$^0{}_4$ (L4) ⑬ | SD$^0{}_5$ (L5) ⑭ | SD$^0{}_4$ (R4) ⑮ | SD$^0{}_5$ (R5) ⑯ |
| SD$^0{}_6$ (L6) ⑰ | SD$^0{}_7$ (L7) ⑱ | SD$^0{}_6$ (R6) ⑲ | SD$^0{}_7$ (R7) ⑳ |
| SD$^0{}_8$ (L8) ◯ 21 | SD$^0{}_9$ (L9) ◯ 22 | SD$^0{}_8$ (R8) ◯ 23 | SD$^0{}_9$ (R9) ◯ 24 |
| SD$^0{}_{10}$ (L10) ◯ 25 | SD$^0{}_{11}$ (L11) ◯ 26 | SD$^0{}_{10}$ (R10) ◯ 27 | SD$^0{}_{11}$ (R11) ◯ 28 |
| SD$^0{}_{12}$ (L12) ◯ 29 | SD$^0{}_{13}$ (L13) ◯ 30 | SD$^0{}_{12}$ (R12) ◯ 31 | SD$^0{}_{13}$ (R13) ◯ 32 |
| SD$^0{}_{14}$ (L14) ◯ 33 | SD$^0{}_{15}$ (L15) ◯ 34 | SD$^0{}_{14}$ (R14) ◯ 35 | SD$^0{}_{15}$ (R15) ◯ 36 |
| SD$^0{}_{16}$ (L16) ◯ 37 | SD$^0{}_{17}$ (L17) ◯ 38 | SD$^0{}_{16}$ (R16) ◯ 39 | SD$^0{}_{17}$ (R17) ◯ 40 |
| SD$^0{}_{18}$ (L18) ◯ 41 | SD$^0{}_{19}$ (L19) ◯ 42 | SD$^0{}_{18}$ (R18) ◯ 43 | SD$^0{}_{19}$ (R19) ◯ 44 |
| SD$^0{}_{20}$ (L20) ◯ 45 | SD$^0{}_{21}$ (L21) ◯ 46 | SD$^0{}_{20}$ (R20) ◯ 47 | SD$^0{}_{21}$ (R21) ◯ 48 |
| SD$^0{}_{22}$ (L22) ◯ 49 | SD$^0{}_{23}$ (L23) ◯ 50 | SD$^0{}_{22}$ (R22) ◯ 51 | SD$^0{}_{23}$ (R23) ◯ 52 |
| SD$^0{}_{24}$ (L24) ◯ 53 | SD$^0{}_{25}$ (L25) ◯ 54 | SD$^0{}_{24}$ (R24) ◯ 55 | SD$^0{}_{25}$ (R25) ◯ 56 |
| SD$^0{}_{26}$ (L26) ◯ 57 | SD$^0{}_{27}$ (L27) ◯ 58 | SD$^1{}_{26}$ (R26) ◯ 59 | SD$^1{}_{27}$ (R27) ◯ 60 |
| SP$^2$ (L RANGE) ◯ 61 | SP$^2$ (L FILTER) ◯ 62 | SP$^3$ (R RANGE) ◯ 63 | SP$^3$ (R FILTER) ◯ 64 |
| SD$^2{}_0$ (L0) ◯ 65 | SD$^2{}_1$ (L1) ◯ 66 | SD$^3{}_0$ (R0) ◯ 67 | SD$^3{}_1$ (R1) ◯ 68 |
| . | . | . | . |
| . | . | . | . |
| . | . | . | . |
| . | . | . | . |
| . | . | . | . |

(4 BITS per column)

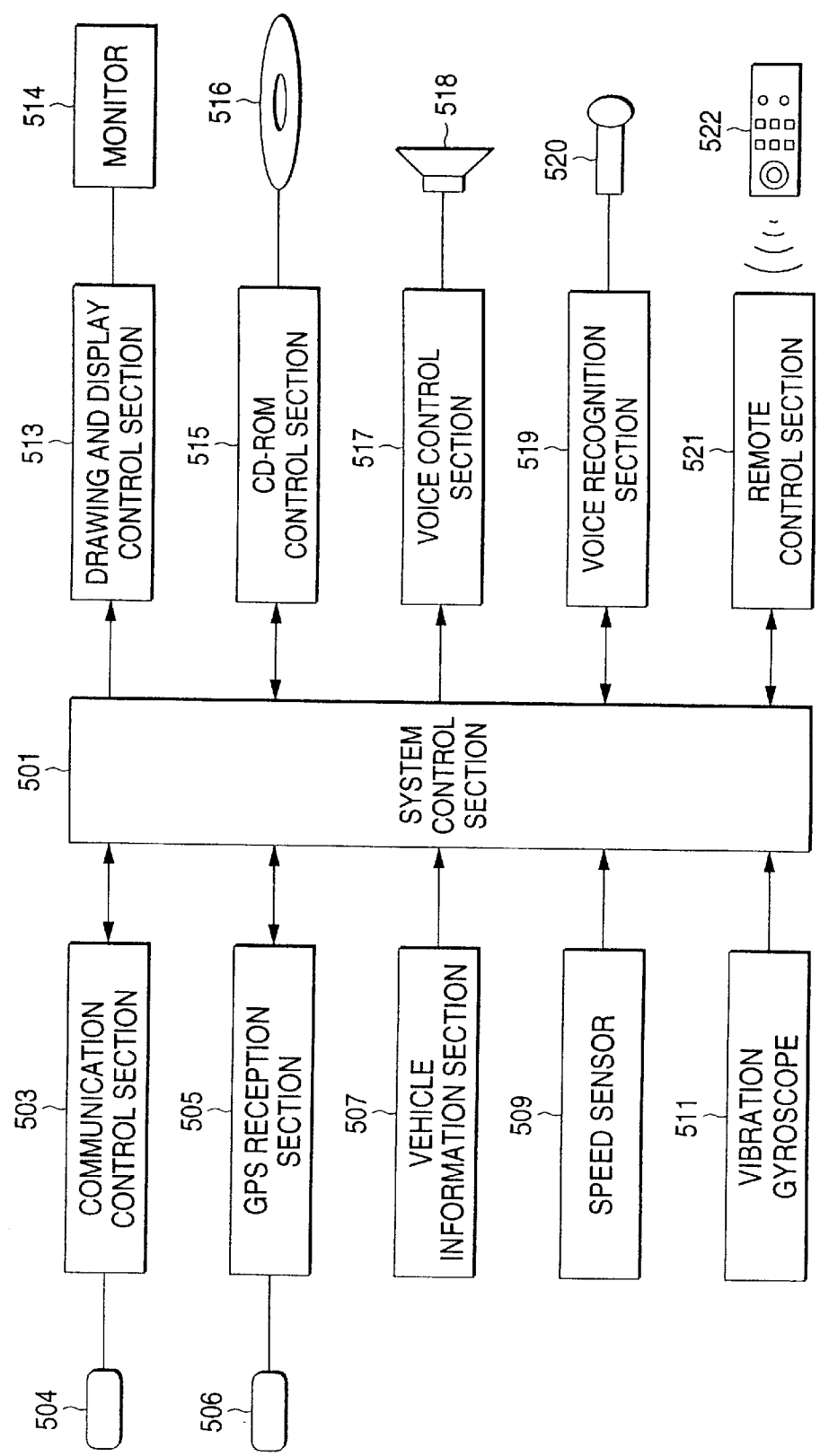

VOICE CONTROL SYSTEM AND NAVIGATION SYSTEM USING SAME

BACKGROUND OF THE INVENTION

This invention relates to a voice control system, a voice control method, a recording medium storing a program for executing the method, a navigation system using the system, method, and recording medium, a navigation apparatus using the voice control system, and a vehicle installing the navigation apparatus and in particular to a voice control system, a voice control method, and a voice control recording medium for decoding voice data coded on different standards, particularly voice data coded in Pulse Code Modulation (PCM) and voice data coded in Adaptive Differential Pulse Code Modulation (ADPCM) on Navigation Kenkyukai (Navigation Research Association) standard and CD-ROM XA standard and transferring the resultant data to a D/A converter, a navigation system using the system, method, or recording medium, a navigation apparatus using the voice control system, and a vehicle installing the navigation apparatus.

FIG. 21 is a schematic block diagram to show an example of a conventional voice control system. In the figure, numeral 201 is count means for counting a value in a cycle of 22.05 kHz, numeral 202 is data storage means for temporarily storing voice data sent from the outside by a first voice data signal, numeral 208 is write count means for counting according to a data write signal, numeral 209 is data write means for writing voice data sent from the outside by the first voice data signal into the data storage means 202 according to a count output from the write count means 208, numeral 203 is data read means for reading voice data from the data storage means 202 according to a six-bit count of the count means 201, numeral 204 is decode means for decoding the voice data read by the data read means 203 based on the ADPCM on the Navigation Research Association standard, numeral 205 is data synchronization means for outputting the voice data output from the decode means 204 in synchronization with a synchronizing signal, numeral 206 is parallel/serial data conversion means (P/S data conversion means) for converting the 16-bit voice data output from the data synchronization means 205 into one-bit voice data, and numeral 207 is frequency division means for dividing a basic synchronizing signal and giving resultant synchronizing signals to the count means 201, the data synchronization means 205, and the P/S data conversion means 206.

The operation of the described conventional voice control system is as follows: To decode stereo voice data coded in the ADPCM on the Navigation Research Association standard, the conventional voice control system stores voice data sent in 16-bit units from the first voice data signal in FIG. 21 in the data storage means 202 by the data write means 209 while counting from 0 to 15 according to a data write signal by the write count means 208.

Next, the data storage means 202 and the voice data coded in the ADPCM will be discussed with reference to FIG. 22. The data storage means 202 can store 256-bit data as a 16-×16-bit matrix and the voice data input in 16-bit units is stored in rows in the order of row (1) to row (16). The stereo voice data coded in the ADPCM on the Navigation Research Association standard is made up of 64 data pieces each consisting of four bits per sound group. Of the 64 data pieces, four data pieces of L range, L filter, R range, and R filter are parameter data for decoding voice data and the remaining 60 data pieces of L0 to L29 and R0 to R29 are coded sample data. The L range, L filter, and L0 to L29 are left voice data and the R range, R filter, and R0 to R29 are right voice data.

The count means 201 in FIG. 21 counts from 0 to 63 as a count signal in FIG. 23 according to a first synchronizing signal (22.05 kHz) from the frequency division means 207. The data read means 203 outputs the voice data stored in the data storage means 202 as a second voice data signal in FIG. 23 four bits at a time in the order of row (1) column I, row (1) column III, row (1) column II, row (1) column IV, row (2) column I, row (2) column III, row (2) column II, row (2) column IV, . . . row (16) column IV in FIG. 22 according to a count signal from the count means 201.

The range data, the filter data, and the sample data output from the data storage means 202 in FIG. 21 are input to the decode means 204 and are decoded to 16-bit voice data based on the ADPCM on the Navigation Research Association standard, then output as a third voice data signal as shown in FIG. 23. The third voice data signal is output as a fourth voice data signal as shown in FIG. 23 according to a second synchronizing signal (11.025 kHz) and a third synchronizing signal (44.1 kHz) from the data synchronization means 205.

The fourth voice data signal is converted from parallel data into serial data as shown in FIG. 24 by the P/S data conversion means 206 according to a serial control signal (2.82 MHz), then output as a fifth voice data signal. This fifth voice data signal is output together with an LR control signal (88.2 kHz) and the serial control signal (2.82 MHz) from the voice control system to a D/A converter.

However, in the configuration of the conventional voice control system, when the voice data is transferred to the D/A converter, the voice data on the CD-ROM XA standard differs from that on the Navigation Research Association standard in sampling frequency, the number of sample data pieces, and storage method in CD-ROM; resultantly, one voice control system cannot decode the voice data coded in the ADPCM systems based on the different standards of the CD-ROM XA standard and Navigation Research Association standard and separate voice control systems are required for the voice data on the CD-ROM XA standard and that on the Navigation Research Association standard. To process both the voice data coded on the CD-ROM XA standard and that on the Navigation Research Association standard, the circuitry scale is enlarged.

SUMMARY OF THE INVENTION

It is therefore an object of the invention to provide an excellent voice control system, an excellent voice control method, and a voice control method recording medium capable of decoding voice data coded in ADPCM on different standards such as the Navigation Research Association standard and the CD-ROM XA standard and transferring the resultant data to a D/A converter by the minimum necessary circuit configuration or steps, a navigation system using the system, method, or recording medium, a navigation apparatus using the voice control system, and a vehicle installing the navigation apparatus.

It is another object of the invention to provide an excellent voice control system, an excellent voice control method, and a voice control method recording medium capable of decoding voice data coded in ADPCM on the Navigation Research Association standard, voice data coded in ADPCM on the CD-ROM XA standard, and voice data coded in PCM and transferring the resultant data to a D/A converter by the minimum necessary circuit configuration or steps, a navigation system using the system, method, or recording medium, a navigation apparatus using the voice control system, and a vehicle installing the navigation apparatus.

To accomplish the objects, according to the invention, there are provided an excellent voice control system, an excellent voice control method, and a voice control method recording medium capable of processing voice data coded in ADPCM on different standards and voice data coded in PCM by sorting input voice data coded in a coding system on a specific standard and selecting a basic synchronizing signal matching the sampling frequency, a navigation system using the system, method, or recording medium, a navigation apparatus using the voice control system, and a vehicle installing the navigation apparatus To solve the problems, according to the first aspect of the invention, there is provided a voice control system first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, data read means for reading the voice data from the third data storage means according to a count output from the count means, decode means for decoding voice data output from the data read means, data synchronization means for outputting the voice data output from the decode means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/serial data conversion means.

According to the second aspect of the invention, there is provided a voice control system comprising first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, first data read means for reading the voice data from the third data storage means according to a count output from the count means, second data read means for reading voice data from the third data storage means according to a different count from that for the first data read means, decode means for decoding voice data output from the first data read means, data selection means for selecting voice data output by the decode means or voice data output by the second data read means according to a control signal, data synchronization means for outputting the voice data output from the data selection means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/serial data conversion means.

According to the third aspect of the invention, the voice control system of the first or second aspect of the invention further includes data interpolation means for interpolating the voice data output from the data synchronization means.

According to the fourth aspect of the invention, the voice control system of the third aspect, when the input voice data is of a different sampling frequency, the synchronizing signal cycle in which the count means counts based on the synchronizing signal given from the frequency division means is changed and the number of times the data interpolation means interpolates the voice data output from the decode means is changed.

According to the fifth aspect of the invention, in the voice control system as mentioned above, the data sort means sorts the voice data stored in the first data storage means only if the input voice data is voice data coded in the coding system on the specific standard, and the data sort means outputs the voice data stored in the first data storage means as it is without sorting if the input voice data is voice data coded in a coding system on another standard different from the coding system on the specific standard.

According to the sixth aspect of the invention, there is provided a voice control method comprising a data sort step of sorting input voice data if the input voice data is coded in a coding system on a specific standard, a data write step of writing the voice data sorted by the data sort step into data storage means according to a count based on a predetermined write timing, a count step of counting a value in a predetermined cycle responsive to the input voice data, a data read step of reading the voice data from the data storage means according to a count output from the count step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by the data read step is decoded, that the decoded voice data is synchronized with the synchronizing signal selected by the basic synchronizing signal selection step, and that the voice data is converted from synchronous parallel data into serial data.

According to the seventh aspect of the, there is provided a voice control method comprising a data sort step of sorting input voice data if the input voice data is coded in a coding system on a specific standard, a data write step of writing the voice data sorted by the data sort step into data storage means according to a count based on a predetermined write timing, a count step of counting a value in a predetermined cycle responsive to the input voice data, a first data read step of reading the voice data from the data storage means according to a count output from the count step, a second data read step of reading voice data from the data storage means according to a different count from that for the first data read step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by the first data read step is decoded, that the decoded voice data or the voice data read by the second data read step is selected, that the selected voice data is synchronized with the synchronizing signal selected by the basic synchronizing signal selection step, and that the voice data is converted from synchronous parallel data into serial data.

According to the eighth aspect of the invention, the voice control method of the sixth or seventh aspect further includes a data interpolation step of interpolating the voice data synchronized by the data synchronization step.

According to the ninth aspect of the invention, in the voice control method of the eighth aspect, when the input voice data is of a different sampling frequency, the count cycle in the count step is changed and the number of times the decoded voice data is interpolated is changed for interpolating the data.

According to the tenth aspect of the invention, in the voice control method of sixth, seventh, eighth or ninth aspect, the data sort step sorts the voice data only if the input voice data is voice data coded in the coding system on the specific standard, and the data sort step does not sort the voice data if the input voice data is voice data coded in a coding system on another standard different from the coding system on the specific standard.

According to the eleventh aspect of the, there is provided a computer-readable recording medium recording a program for instructing a computer to execute the voice control method of the sixth, seventh, eighth, ninth, or tenth aspect.

According to the twelfth aspect of the, there is provided a navigation system using a voice control system comprising first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, data read means for reading the voice data from the third data storage means according to a count output from the count means, decode means for decoding voice data output from the data read means, data synchronization means for outputting the voice data output from the decode means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/serial data conversion means.

According to the thirteenth aspect of the invention, there is provided a navigation system using a voice control system comprising first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, first data read means for reading the voice data from the third data storage means according to a count output from the count means, second data read means for reading voice data from the third data storage means according to a different count from that for the first data read means, decode means for decoding voice data output from the first data read means, data selection means for selecting voice data output by the decode means or voice data output by the second data read means according to a control signal, data synchronization means for outputting the voice data output from the data selection means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/serial data conversion means.

According to the fourteenth aspect of the invention, in the navigation system of the twelfth or thirteenth aspect, the voice control system further includes data interpolation means for interpolating the voice data output from the data synchronization means.

According to the fifth aspect of the invention, in the navigation system of the fourteenth aspect, when the input voice data is of a different sampling frequency, the synchronizing signal cycle in which the count means counts based on the synchronizing signal given from the frequency division means is changed and the number of times the data interpolation means interpolates the voice data output from the decode means is changed.

According to the sixteenth aspect of the invention, there is provided a navigation system using a voice control method comprising a data sort step of sorting input voice data if the input voice data is coded in a coding system on a specific standard, a data write step of writing the voice data sorted by the data sort step into data storage means according to a count based on a predetermined write timing, a count step of counting a value in a predetermined cycle responsive to the input voice data, a data read step of reading the voice data from the data storage means according to a count output from the count step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by the data read step is decoded, that the decoded voice data is synchronized with the synchronizing signal selected by the basic synchronizing signal selection step, and that the voice data is converted from synchronous parallel data into serial data.

According to the seventeenth aspect of the invention, there is provided a navigation system using a voice control method comprising a data sort step of sorting input voice data if the input voice data is coded in a coding system on a specific standard, a data write step of writing the voice data sorted by the data sort step into data storage means according to a count based on a predetermined write timing, a count step of counting a value in a predetermined cycle responsive to the input voice data, a first data read step of reading the voice data from the data storage means according to a count output from the count step, a second data read step of reading voice data from the data storage means according to a different count from that for the first data read step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by the first data read step is decoded, that the decoded voice data or the voice data read by the second data read step is selected, that the selected voice data is synchronized with the synchronizing signal selected by the basic synchronizing signal selection step, and that the voice data is converted from synchronous parallel data into serial data.

According to the eighteenth aspect of the invention, in the navigation system of the sixteenth or seventeenth aspect, the voice control method further includes a data interpolation step of interpolating the voice data synchronized by the data synchronization step.

According to the nineteenth aspect of the invention, in the navigation system of the eighteenth aspect, when the input voice data is of a different sampling frequency, the count cycle in the count step is changed and the number of times the decoded voice data is interpolated is changed for interpolating the data.

According to the twentieth aspect of the invention, there is provided a navigation system using a computer-readable recording medium recording a program for instructing a computer to execute the voice control method of the sixth, seventh, eighth, ninth, or tenth aspect.

According to the twenty-first aspect of the invention, there is provided a navigation apparatus using a voice control system comprising first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, data read means for reading the voice data from the third data storage means according to a count output from the count means, decode means for decoding voice data output from the data read means, data synchronization means for outputting the voice data output from the decode means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/serial data conversion means.

According to the twenty-second aspect of the invention, there is provided a navigation apparatus using a voice control system comprising first data storage means for temporarily storing input voice data, data sort means for sorting the voice data stored in the first data storage means if the input voice data is coded in a coding system on a specific standard, second data storage means for temporarily storing the voice data sorted by the data sort means, count means for counting a value in a predetermined cycle responsive to the input voice data, third data storage means for temporarily storing the voice data output from the second data storage means, write count means for counting according to a data write signal, data write means for writing the voice data output from the second data storage means into the third data storage means according to a count output from the write count means, first data read means for reading the voice data from the third data storage means according to a count output from the count means, second data read means for reading voice data from the third data storage means according to a different count from that for the first data read means, decode means for decoding voice data output from the first data read means, data selection means for selecting voice data output by the decode means or voice data output by the second data read means according to a control signal, data synchronization means for outputting the voice data output from the data selection means in synchronization with a synchronizing signal, parallel/serial data conversion means for converting the voice data output from the data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from the basic synchronizing signal selection means to generate synchronizing signals to be given to the count means, the data synchronization means, and the parallel/ serial data conversion means.

According to the twenty-third aspect of the invention, in the navigation apparatus of the twenty-first or twenty-second aspect, the voice control system further includes data interpolation means for interpolating the voice data output from the data synchronization means.

According to the twenty-fourth aspect of the invention, in the navigation apparatus of the twenty-third, when the input voice data is of a different sampling frequency, the synchronizing signal cycle in which the count means counts based on the synchronizing signal given from the frequency division means is changed and the number of times the data interpolation means interpolates the voice data output from the decode means is changed.

According to the twenty-fifth aspect of the invention, there is provided a vehicle installing the navigation apparatus of the twenty-first, twenty-second, twenty-third, or twenty-fourth aspect.

With the voice control system of the first aspect, the voice control method the sixth aspect, the recording medium of the eleventh aspect, the navigation systems of the eleventh, sixteenth and the twentieth aspects, the navigation apparatus of the twenty-first aspects, and the vehicle of the twenty-fifth, to decode the voice data coded in a coding system on a specific standard (for example, ADPCM on a different standard), the voice data is previously sorted by the data sort means (or data sort step), then decoding, synchronizing with a synchronizing signal, and conversion to serial data are performed, and the resultant data is transferred to the D/A converter, whereby the minimum necessary circuit configuration or steps are only added to the processing routine or circuit configuration dedicated to the voice data coded in a coding system on a different standard (for example, a decoder dedicated to ADPCM voice data for the Navigation Research Association standard or the like), so that the voice data coded in ADPCM on different standards such as the Navigation Research Association standard and the CD-ROM XA standard can be decoded and transferred to the D/A converter. Since the voice control system, voice control method, or voice control method recording medium can be provided by adding the minimum necessary circuit configuration or processing steps, namely, by circuit change or processing routine change on a small scale, the invention can contribute to reduction in the costs of the navigation system, navigation apparatus, and vehicle and miniaturization thereof.

With the voice control system of the second aspect, the voice control method of the seventh aspect, the recording medium of the eleventh aspect, the navigation systems of the thirteenth, seventeenth, and twenties aspect, the navigation apparatus of the twenty-second aspect, and the vehicle of the twenty-fifth aspect, to decode the voice data coded in a coding system on a specific standard (for example, ADPCM on a different standard), the voice data is previously sorted by the data sort means (or data sort step), the first and second data read means (first and second data read steps) are provided for reading voice data from the data storage means according to different counts corresponding to the coding systems, the voice data from the first data read means (first data read step) is decoded, and the decoded voice data or the voice data from the second data read means (second data read step) is selected, then synchronizing with a synchronizing signal and conversion to serial data are performed, and the resultant data is transferred to the D/A converter, whereby the minimum necessary circuit configuration or steps are only added to the processing routine or circuit configuration dedicated to the voice data coded in a coding system on a different standard (for example, a decoder dedicated to ADPCM voice data for the Navigation Research Association standard or the like) without the need for additional data storage means, etc., so that the voice data coded in ADPCM on different standards such as the Navigation Research Association standard and the CD-ROM XA standard or the voice data coded in PCM can be decoded and transferred to the D/A converter. Since the voice control system, voice control method, or voice control method recording medium can be provided by adding the minimum necessary circuit configuration or processing steps, namely, by circuit change or processing routine change on a small scale, the invention can contribute to reduction in the costs of the navigation system, navigation apparatus, and vehicle and miniaturization thereof.

With the voice control system of the third aspect, the voice control method of the eighth aspect, the recording medium of the eleventh aspect, the navigation systems of the fourteenth, eighteenth and twentieth aspects, the navigation apparatus of the twenty-third aspect, and the vehicle of the twenty-fifth aspect, the data interpolation means (data interpolation step) interpolates the voice data output from the data synchronization means in a cycle lower than the sampling frequency of the voice data, so that abrupt volume change can be suppressed for the voice data coded in different coding systems such as ADPCM coded voice data on different standards and PCM coded voice data.

With the voice control system of the fourth aspect, the voice control method of the ninth aspect, the recording medium of the eleventh aspect, the navigation systems of the fifteenth, nineteenth and twentieth aspects, the navigation apparatus of the twenty-fourth aspect, and the vehicle of the twenty-fifth aspect, the synchronizing signal cycle in which the count means (count step) counts based on the synchronizing signal given from the frequency division means is changed and the number of times the data interpolation means (data interpolation step) interpolates the voice data output from the decode means (decode step) is changed, whereby voice data can be reliably decoded and transferred to the D/A converter even when the input voice data is of a different sampling frequency.

Further, with the voice control system of the fifth aspect, the voice control method of the tenth aspect, the recording medium of the eleventh aspect, and the navigation systems of the twentieth aspect, preferably the data sort means (data sort step) sorts the voice data only if the input voice data is voice data coded in the coding system on the specific standard, and the data sort means (data sort step) does not sort the voice data if the input voice data is voice data coded in a coding system on another standard different from the coding system on the specific standard.

BRIEF DESCRIPTION OF THE DRAWINGS

FIG. 6 is a conceptual drawing to show data placement positions when PCM coded data is stored in third data storage means in the embodiments of the invention;

FIG. 7 is a timing chart of signals output from components when ADPCM coded data is processed in the first embodiment of the invention;

FIG. 8 is a timing chart of signal output from parallel-serial data conversion means when ADPCM coded data is processed in the first embodiment of the invention;

FIG. 9 is a timing chart of signals output from components when PCM coded data is processed in the second embodiment of the invention;

FIG. 10 is a timing chart of signal output from parallel-serial data conversion means when PCM coded data is processed in the second embodiment of the invention;

FIG. 11 is a timing chart of signals output from components when ADPCM coded data is processed in the third embodiment of the invention;

FIG. 12 is a timing chart of signal output from parallel-serial data conversion means when ADPCM coded data is processed in the third embodiment of the invention;

FIG. 15 is a timing chart of signals output from components when ADPCM coded data is processed in the fourth embodiment of the invention;

FIG. 16 is a timing chart of signal output from parallel-serial data conversion means when ADPCM coded data is processed in the fourth embodiment of the invention;

FIG. 19 is a timing chart of signals output from components when PCM coded data is processed in the fourth embodiment of the invention;

FIG. 20 is a timing chart of signal output from parallel-serial data conversion means when PCM coded data is processed in the fourth embodiment of the invention;

FIG. 22 is a conceptual drawing to show data placement positions when ADPCM coded data on Navigation Research Association standard is stored in data storage means;

FIG. 25 is a conceptual drawing to show data placement positions when ADPCM coded data on CD-ROM XA standard is stored in data storage means;

FIG. 26 is a conceptual drawing to show data placement positions when ADPCM coded data on CD-ROM XA standard is stored in second data storage means in the embodiments of the invention; and FIG. 27 is a block diagram of a navigation system according to a fifth embodiment of the invention.

DETAILED DESCRIPTION OF THE PREFERRED EMBODIMENTS

Embodiments of voice control systems, voice control methods, recording media, navigation systems using the system, method, and recording medium, navigation apparatus using the voice control system, and vehicles installing the navigation apparatus according to the invention will be discussed in the order of first to fifth embodiments with reference to the accompanying drawings.

Since each recording medium according to the invention is a recording medium storing a program for executing each voice control method, the description of the recording media is contained in the description of the voice control methods.

First embodiment

Figure 1:
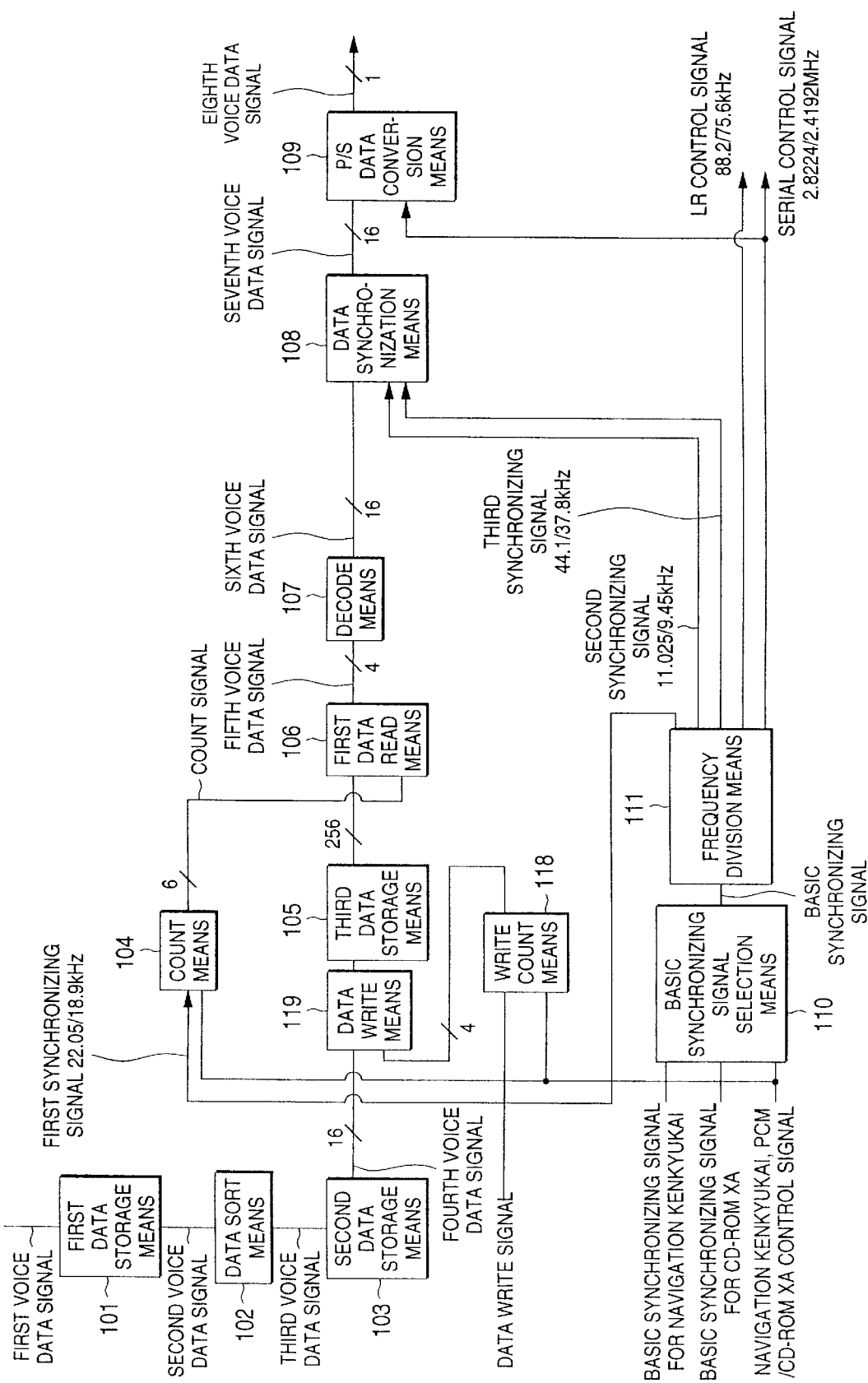
FIG. 1 is a block diagram of a voice control system according to a first embodiment of the invention.
Figure 21:
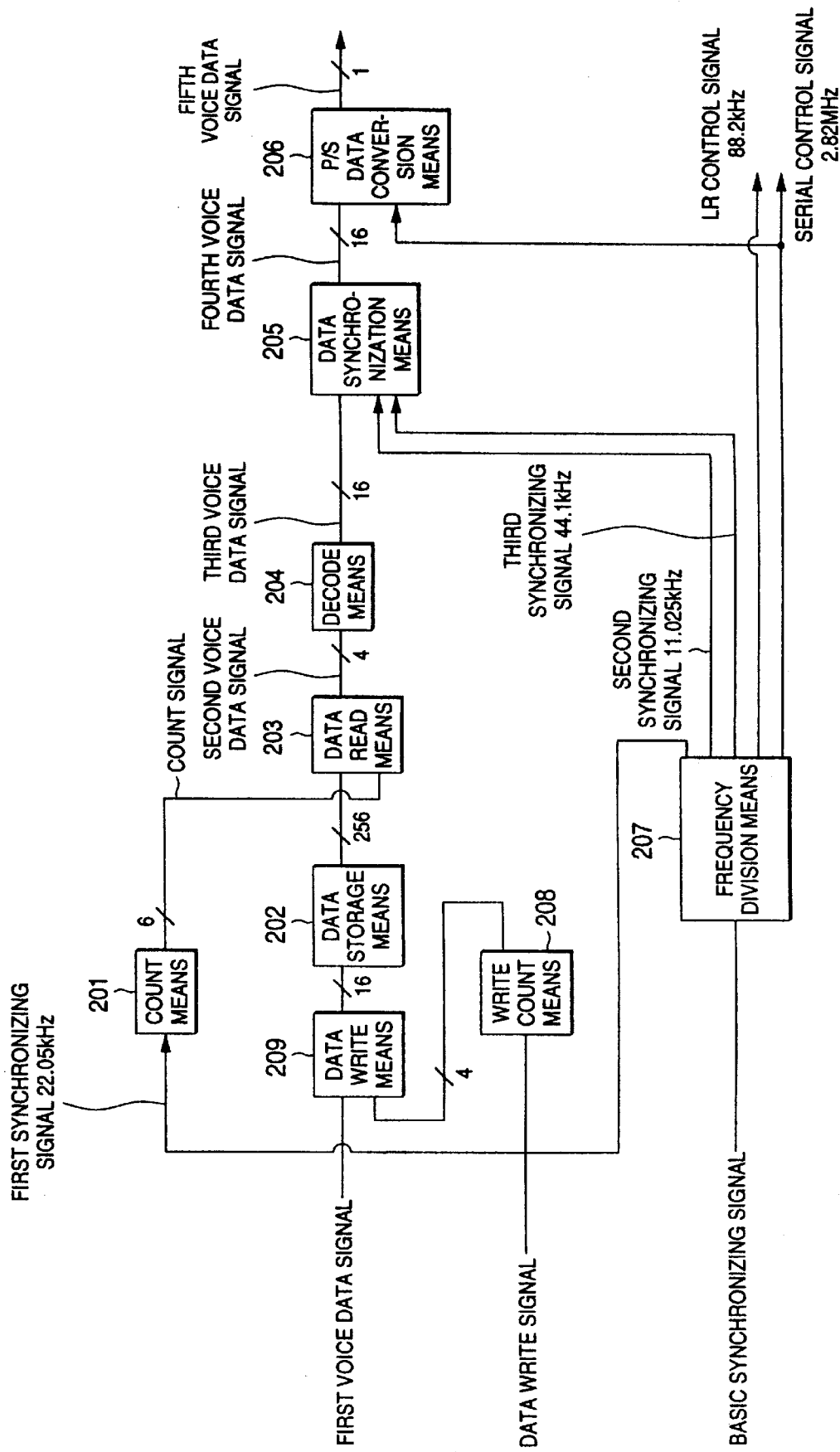
FIG. 21 is a block diagram of a conventional voice control system.
Figure 23:
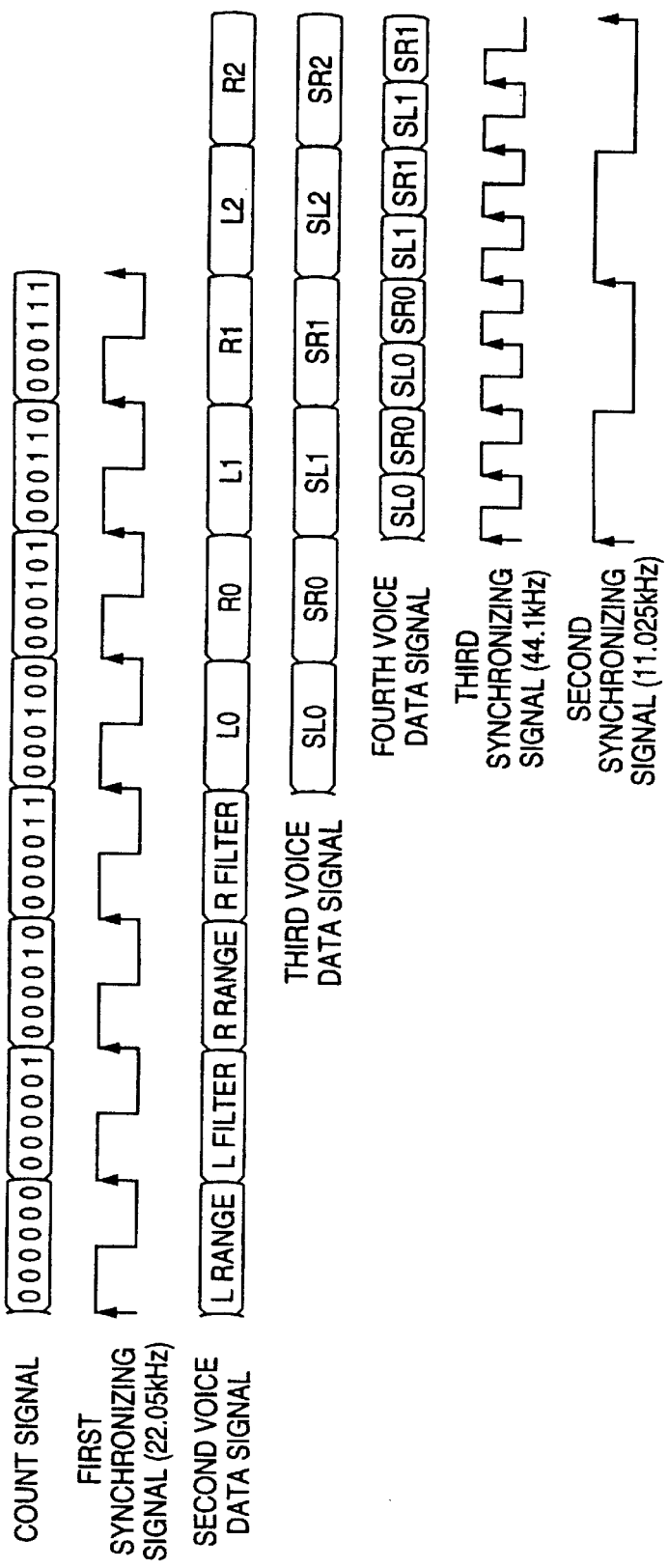
FIG. 23 is a timing chart of signals output from components when ADPCM coded data is processed in the conventional voice control system.
Figure 24:
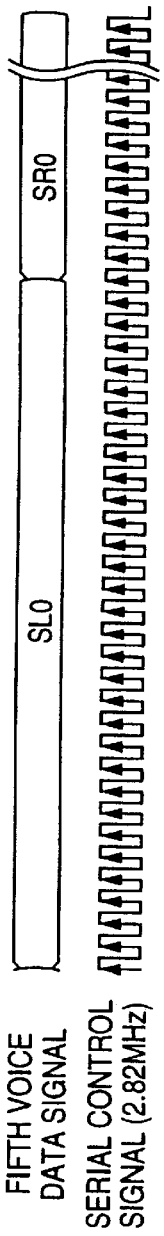
FIG. 24 is a timing chart of signal output from parallel-serial data conversion means when ADPCM coded data is processed in the conventional voice control system.

FIG. 1 is a block diagram of a voice control system according to a first embodiment of the invention. Parts identical with or similar to those previously described with reference to FIG. 21 are denoted by the same reference numerals in FIG. 1.

In FIG. 1, the voice control system of the first embodiment comprises first data storage means 101, data sort means 102, second data storage means 103, count means 104, third data storage means 105, write count means 118, data write means 119, data read means 106, decode means 107, data synchronization means 108, parallel/serial data conversion means (P/S data conversion means) 109, basic synchronizing signal selection means 110, and frequency division means 111.

The first data storage means 101 temporarily stores input voice data sent as a first voice data signal from the outside of the voice control system. The data sort means 102 sorts voice data sent as a second voice data signal from the first data storage means 101. It sorts voice data only if the input voice data is voice data coded in a coding system on a specific standard (in the embodiment, ADPCM on the CD-ROM XA standard). If the input voice data is voice data coded in a coding system on a different standard (ADPCM on the Navigation Research Association standard), the data sort means 102 does not sort the voice data and allows the data to pass through. The second data storage means 103 stores voice data sent as a third voice data signal from the data sort means 102.

The third data storage means 105 temporarily stores voice data sent as a fourth voice data signal from the second data storage means 103. The write count means 118 counts according to a data write signal and the data write means 119 writes voice data sent as the fourth voice data signal from the second data storage means 103 into the third data storage means 105 according to a count output from the write count means 118.

The count means 104 counts a value according to a first synchronizing signal (22.05/18.9 kHz) provided by dividing a basic synchronizing signal by 512. The data read means 106, to which a six-bit count signal from the count means 104 is connected, reads data from the third data storage means 105 according to the count of the count means 104 and outputs the read data as a fifth voice data signal. Here, if the handled voice data is coded in the ADPCM on the Navigation Research Association standard, the first synchronizing signal is 22.05 kHz; if the handled voice data is coded in the ADPCM on the CD-ROM XA standard, the first synchronizing signal is 18.9 kHz. The decode means 107 decodes the fifth voice data signal read out by the data read means 106 based on the ADPCM on the CD-ROM XA or Navigation Research Association standard and outputs the resultant data as a sixth voice data signal.

The data synchronization means 108 synchronizes the sixth voice data signal output from the decode means 107 with a synchronizing signal and outputs the signal as a seventh voice data signal. The P/S data conversion means 109 converts the 16-bit parallel voice data output from the data synchronization means 108 into one-bit serial voice data and outputs the data as an eighth voice data signal.

The basic synchronizing signal selection means 110 selects a basic synchronizing signal required for processing voice data sampled on the Navigation Research Association or CD-ROM XA standard based on a Navigation Research Association/CD-ROM XA control signal. The frequency division means 111 divides the basic synchronizing signal selected by the basic synchronizing signal selection means 110 to generate synchronizing signals and control signals and gives a first synchronizing signal (22.05/18.9 kHz) to the count means 104, a second synchronizing signal (11.025/9.45 kHz) and a third synchronizing signal (44.1/37.8 kHz) to the data synchronization means 108, and a serial control signal (2.8224/2.4192 MHz) to the P/S data conversion means 109. It also generates an LR control signal (88.2/75.6 kHz). The former frequency values enclosed in parentheses correspond to the ADPCM on the Navigation Research Association standard and the latter frequency values correspond to the ADPCM on the CD-ROM XA standard.

Next, a voice control method in the described voice control system of the embodiment will be discussed with reference to FIG. 1, FIG. 5, FIG. 7, FIG. 8, and FIG. 25.

First, to decode voice data coded in the ADPCM on the Navigation Research Association standard (coding system on a different standard), the voice control system of the embodiment allows input voice data to pass through without sorting the voice data in the data sort means 102 and stores the data in the second data storage means 103. The subsequent processing of data write, data read, decode, synchronization, and data conversion is the same as that in the conventional voice control system (see FIG. 21 to FIG. 24) and therefore will not be discussed again.

Next, an example will be discussed wherein the voice control system of the embodiment decodes voice data coded in the ADPCM on the CD-ROM XA standard (coding system on specific standard). The stereo voice data coded in the ADPCM on the CD-ROM XA standard is made up of 60 data pieces each consisting of four bits per sound group. Of the 60 data pieces, four data pieces of L range, L filter, R range, and R filter are parameter data for decoding voice data and the remaining 56 data pieces of L0 to L27 and R0 to R27 are coded sample data.

The L range, L filter, and L0 to L27 are left voice data and the R range, R filter, and R0 to R27 are right voice data.

Figure 5:
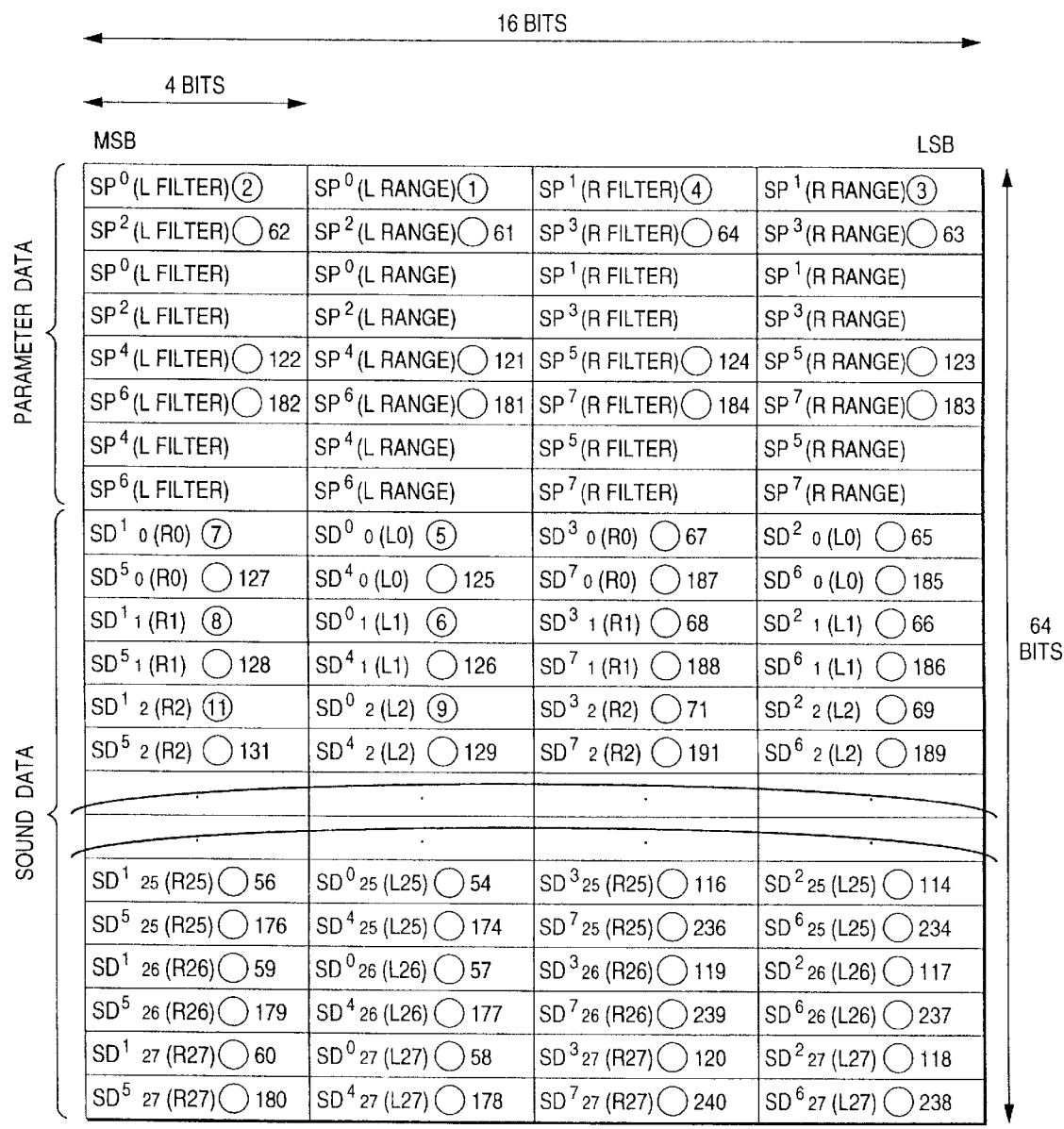
FIG. 5 is a conceptual drawing to show data placement positions when ADPCM coded data on CD-ROM XA standard is stored in first data storage means in the embodiments of the invention.

The voice data on the CD-ROM XA standard is stored in CD-ROM in 128-byte units (16 bytes of parameter data plus 112 bytes of sound data), as shown in FIG. 5.

To process the stereo voice data coded in the ADPCM on the CD-ROM XA standard and sampled at 18.9 kHz, first the voice control system of the embodiment stores voice data stored in CD-ROM (not shown) in the first data storage means 101 in 16-bit units, as shown in FIG. 5, as a first voice data signal.

The data sort means 102 sorts the voice data stored in the first data storage means 101 in the order of the circled numbers and the numbers prefixed by a circle in FIG. 5 and stores the voice data in the second data storage means 103 as shown in FIG. 26.

The write count means 118 counts fourth voice data signal output in 16-bit units from the second data storage means 103 from 0 to 14 according to a data write signal based on a Navigation Research Association, PCM/CD-ROM XA control signal and the data write means 119 stores the data in the third data storage means 105 in the order of row (1), row (2), . . . row (15) as shown in FIG. 25.

The count means 104 counts from 0 to 59 as a count signal shown in FIG. 7 according to a first synchronizing signal (18.9 kHz) from the frequency division means 111 based on the Navigation Research Association, PCM/CD-ROM XA control signal.

The data read means 106 outputs the voice data stored in the third data storage means 105 as a fifth voice data signal as shown in FIG. 7 four bits at a time in the order of row (1) column I, row (1) column III, row (1) column II, row (1) column IV, row (2) column I, row (2) column III, row (2) column II, row (2) column IV, row (15) column IV in FIG. 25 according to a count signal from the count means 104.

The range data, the filter data, and the sample data output from the third data storage means 105 are input to the decode means 107 and are decoded to 16-bit voice data based on the ADPCM on the CD-ROM XA standard, then output as a sixth voice data signal as shown in FIG. 7. The data synchronization means 108 synchronizes the sixth voice data signal with a second synchronizing signal (9.45 kHz), a third synchronizing signal (37.8 kHz) and outputs the data signal as a seventh voice data signal as shown in FIG. 7.

The P/S data conversion means 109 converts the 16-bit seventh voice data signal output from the data synchronization means 108 from parallel data into serial data according to a serial control signal (2.4192 MHz), then outputs the serial data as an eighth voice data signal as shown in FIG. 8. This eighth voice data signal is output together with an LR control signal (75.6 kHz) and the serial control signal (2.4192 MHz) from the voice control system to a D/A converter.

Thus, according to the voice control system of the first embodiment shown in FIG. 1, to process the ADPCM coded voice data on the CD-ROM XA standard, the voice data is sorted by the data sort means 102 in the same data arrangement as the data stored in CD-ROM based on the Navigation Research Association standard before it is transferred to the third data storage means 105, and the basic synchronizing signal is switched to that for the CD-ROM XA standard, whereby as compared with the processing steps and the circuit configuration in the conventional voice control system dedicated to the voice data coded in the ADPCM on the Navigation Research Association standard, the processing steps and the circuit configuration on and after the third data storage means 105 can be used with no change and the minimum necessary circuit configuration or processing steps of the first data storage means 101, the data sort means 102, and the second data storage means 103 are only added, whereby the voice data coded in the ADPCM on the Navigation Research Association standard and the voice data coded in the ADPCM on the CD-ROM XA standard can be decoded and transferred to a D/A converter. In other words, the voice data coded on one standard and the voice data coded on a different standard can be decoded and transferred to the D/A converter by circuit change on a small scale without the need for a separate voice control system for each coding system.

The voice data (stereo data) coded in the ADPCM on the CD-ROM XA standard has been described with the voice control system of the embodiment. However, the voice control system can also handle any other ADPCM coded voice data such as monaural data of voice data coded in the ADPCM coding system on the CD-ROM XA standard by changing the voice data sort method in the data sort means 102.

Second embodiment

Figure 2:
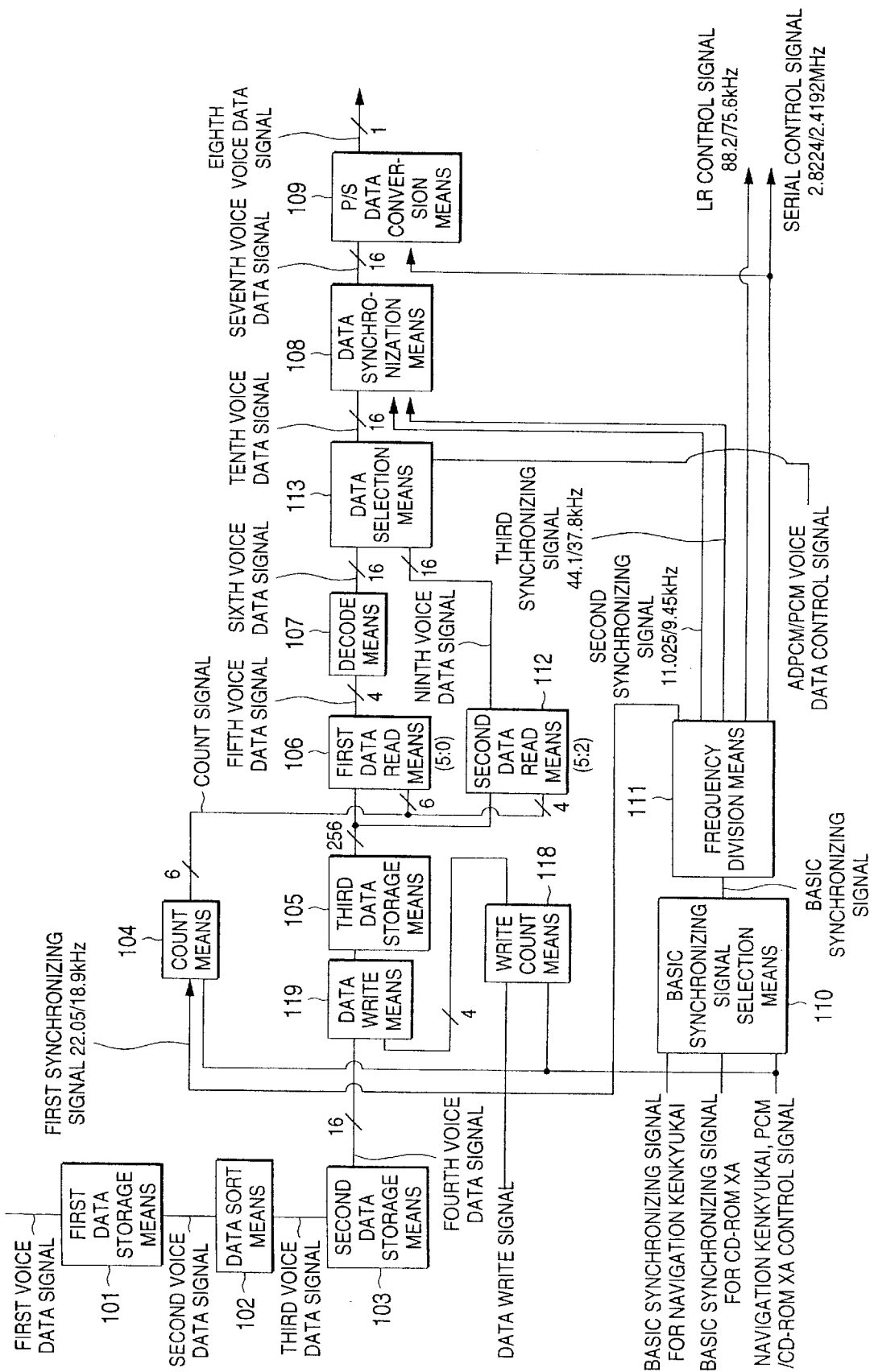
FIG. 2 is a block diagram of a voice control system according to a second embodiment of the invention.

FIG. 2 is a block diagram of a voice control system according to a second embodiment of the invention. Parts identical with or similar to those previously described with reference to FIG. 1 are denoted by the same reference numerals in FIG. 2. In FIG. 2, the voice control system of the second embodiment comprises first data storage means 101, data sort means 102, second data storage means 103, count means 104, third data storage means 105, write count means 118, data write means 119, first data read means 106, decode means 107, second data read means 112, data selection means 113, data synchronization means 108, P/S data conversion means 109, basic synchronizing signal selection means 110, and frequency division means 111. That is, the voice control system of the second embodiment is provided by adding the second data read means 112 and the data selection means 113 to the voice control system of the first embodiment.

The first data storage means 101 temporarily stores input voice data sent as a first voice data signal from the outside of the voice control system. The data sort means 102 sorts voice data sent as a second voice data signal from the first data storage means 101. It sorts voice data only if the input voice data is voice data coded in a coding system on a specific standard (in the embodiment, ADPCM on the CD-ROM XA standard). If the input voice data is voice data coded in a coding system on a different standard or in a different coding system (ADPCM on the Navigation Research Association standard or PCM), the data sort means 102 does not sort the voice data and allows the data to pass through. The second data storage means 103 stores voice data sent as a third voice data signal from the data sort means 102.

The third data storage means 105 temporarily stores voice data sent as a fourth voice data signal from the second data storage means 103. The write count means 118 counts according to a data write signal and the data write means 119 writes voice data sent as the fourth voice data signal from the second data storage means 103 into the third data storage means 105 according to a count output from the write count means 118.

The count means 104 counts a value according to a first synchronizing signal (22.05/18.9 kHz) provided by dividing a basic synchronizing signal by 512. The first data read means 106, to which a six-bit count signal from the count means 104 is connected, reads data from the third data storage means 105 according to the count of the count means 104 and outputs the read data as a fifth voice data signal. The second data read means 112, to which the high-order four bits of a six-bit count signal from the count means 104 are connected, reads data from the third data storage means 105 according to a different count of the count means 104 from that for the first data read means 106 and outputs the read data as a ninth voice data signal.

Here, if the handled voice data is coded in the ADPCM on the Navigation Research Association standard or in the PCM, the first synchronizing signal is 22.05 kHz; if the handled voice data is coded in the ADPCM on the CD-ROM XA standard, the first synchronizing signal is 18.9 kHz. The decode means 107 decodes the fifth voice data signal read out by the first data read means 106 based on the ADPCM on the CD-ROM XA or Navigation Research Association standard and outputs the resultant data as a sixth voice data signal.

The data selection means 113 selects the sixth voice data signal output by the decode means 107 or the ninth voice data signal output by the second data read means 112 according to an ADPCM/PCM voice data control signal and outputs the selected voice data signal as a tenth voice data signal.

The data synchronization means 108 synchronizes the tenth voice data signal output from the data selection means 113 with a synchronizing signal and outputs the signal as a seventh voice data signal. The P/S data conversion means 109 converts the 16-bit parallel voice data output from the data synchronization means 108 into one-bit serial voice data and outputs the data as an eighth voice data signal.

The basic synchronizing signal selection means 110 selects a basic synchronizing signal required for processing voice data sampled on the Navigation Research Association or CD-ROM XA standard based on a Navigation Research Association, PCM/CD-ROM XA control signal. The frequency division means 111 divides the basic synchronizing signal selected by the basic synchronizing signal selection means 110 to generate synchronizing signals and control signals and gives a first synchronizing signal (22.05/18.9 kHz) to the count means 104, a second synchronizing signal (11.025/9.45 kHz) and a third synchronizing signal (44.1/37.8 kHz) to the data synchronization means 108, and a serial control signal (2.8224/2.4192 MHz) to the P/S data conversion means 109. It also generates an LR control signal (88.2/75.6 kHz). The former frequency values enclosed in parentheses correspond to the ADPCM on the Navigation Research Association standard or the PCM and the latter frequency values correspond to the ADPCM on the CD-ROM XA standard.

Next, a voice control method in the described voice control system of the embodiment will be discussed with reference to FIG. 2, FIG. 6, FIG. 9, and FIG. 10.

The voice control system of the second embodiment differs from that of the first embodiment previously described with reference to FIG. 1 in that voice data coded in the PCM is transferred to a D/A converter by sharing the circuitry of the voice control system of the first embodiment.

Therefore, to decode voice data coded in the ADPCM on the Navigation Research Association standard (coding system on a different standard), the voice control system of the embodiment allows input voice data to pass through without sorting the voice data in the data sort means 102 and stores the data in the second data storage means 103. The subsequent processing of data write, data read, decode, synchronization, and data conversion is the same as that in the conventional voice control system (see FIG. 21 to FIG. 24).

Next, to process monaural voice data coded in the PCM and sampled at 22.05 kHz, the operation of the voice control system of the embodiment will be discussed. First, the data sort means 102 does not sort the voice data and the write count means 118 counts fourth voice data signal input in 16-bit units from the second data storage means 103 from 0 to 15 according to a data write signal based on a Navigation Research Association, PCM/CD-ROM XA control signal. The data write means 119 stores the data in the third data storage means 105 in the order of row (1), row (2), . . . row (16) as shown in FIG. 6. The monaural voice data coded in the PCM is made up of 16-bit data pieces.

The count means 104 counts from 0 to 63 as a count signal shown in FIG. 9 according to a first synchronizing signal (22.05 kHz) from the frequency division means 111 based on the Navigation Research Association, PCM/CD-ROM XA control signal. The second data read means 112 outputs the voice data stored in the third data storage means 105 as a ninth voice data signal as shown in FIG. 9 16 bits at a time in the order of row (1), row (2), row (16) in FIG. 6 according to the high-order four bits of a six-bit count signal from the count means 104.

Next, the data selection means 113 selects the ninth voice data signal according to the ADPCM/PCM voice data control signal and outputs the data signal as a tenth voice data signal. The data synchronization means 108 synchronizes the tenth voice data signal with a second synchronizing signal (11.025 kHz) and a third synchronizing signal (44.1 kHz) and outputs the data signal as a seventh voice data signal as shown in FIG. 9.

The P/S data conversion means 109 converts the seventh voice data signal output from the data synchronization means 108 into serial data according to a serial control signal (2.8224 MHz), then outputs the serial data as an eighth voice data signal as shown in FIG. 10. This eighth voice data signal is output together with an LR control signal (88.2 kHz) and the serial control signal (2.8224 MHz) from the voice control system to a D/A converter.

Thus, according to the voice control system of the second embodiment shown in FIG. 2, to process the ADPCM coded voice data on the CD-ROM XA standard, the voice data is sorted by the data sort means 102 in the same data arrangement as the data stored in CD-ROM based on the Navigation Research Association standard before it is transferred to the third data storage means 105, and to process the ADPCM coded voice data on the Navigation Research Association standard or the PCM coded voice data, the count read from the third data storage means 105 is changed depending on the ADPCM/PCM coding system difference. Thus, as compared with the processing steps and the circuit configuration in the conventional voice control system dedicated to the voice data coded in the ADPCM on the Navigation Research Association standard, additional data storage means is not required and the minimum necessary circuit configuration or processing steps of the first data storage means 101, the data sort means 102, the second data storage means 103, the second data read means 112, and the data selection means 113 are only added, whereby the voice data coded in the ADPCM on the Navigation Research Association standard, that coded in the ADPCM on the CD-ROM XA standard, and that coded in the PCM can be decoded and transferred to a D/A converter. In other words, the voice data coded on one standard and the voice data coded on a different standard can be decoded and transferred to the D/A converter by circuit change on a small scale without the need for a separate voice control system for each coding system.

Third embodiment

Figure 3:
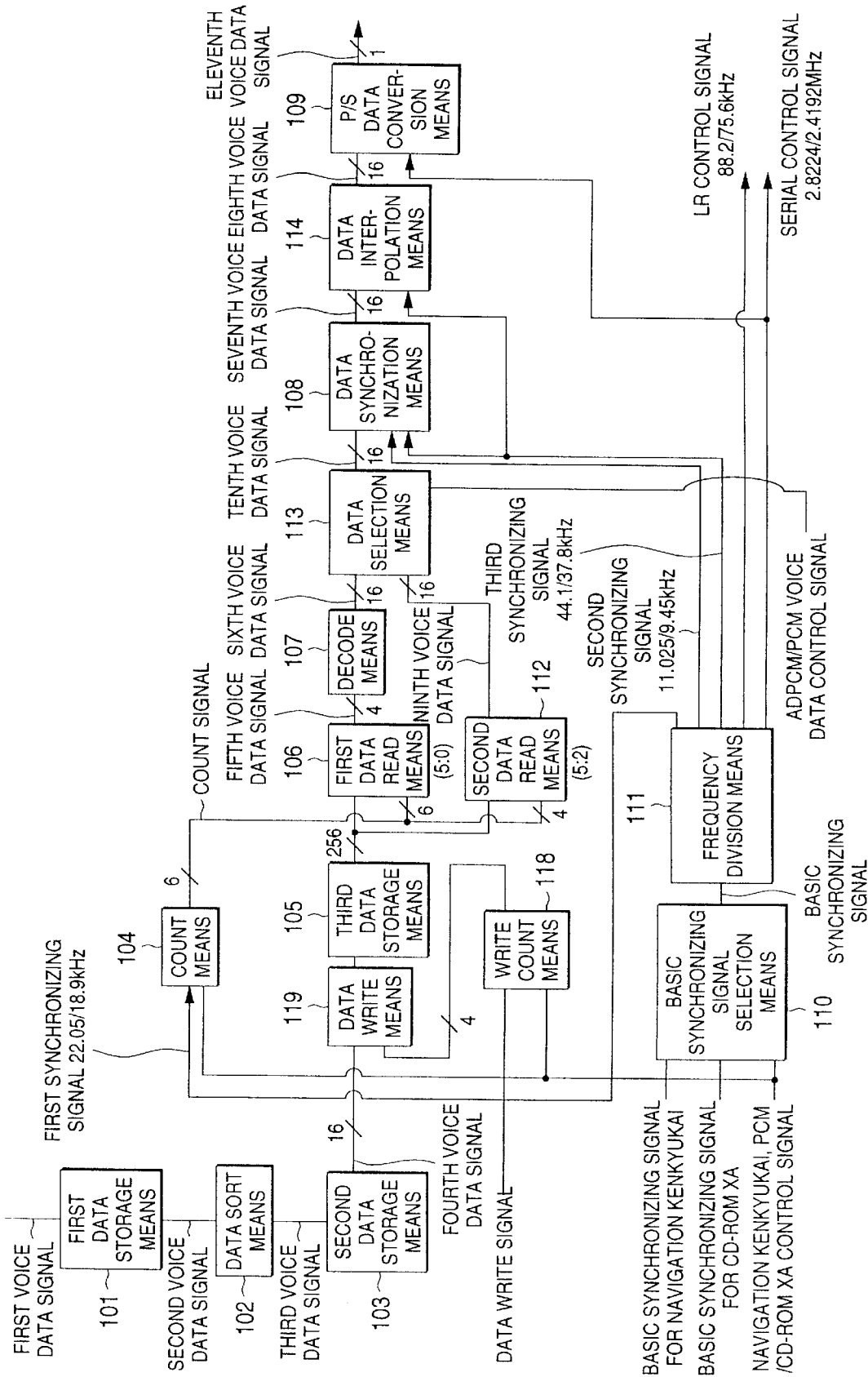
FIG. 3 is a block diagram of a voice control system according to a third embodiment of the invention.

FIG. 3 is a block diagram of a voice control system according to a third embodiment of the invention. Parts identical with or similar to those previously described with reference to FIG. 2 are denoted by the same reference numerals in FIG. 3. In FIG. 3, the voice control system of the third embodiment comprises first data storage means 101, data sort means 102, second data storage means 103, count means 104, third data storage means 105, write count means 118, data write means 119, first data read means 106, decode means 107, second data read means 112, data selection means 113, data synchronization means 108, data interpolation means 114, P/S data conversion means 109, basic synchronizing signal selection means 110, and frequency division means 111.

That is, the voice control system of the third embodiment is provided by adding the data interpolation means 114 to the voice control system of the second embodiment. The data interpolation means 114 interpolates a seventh voice data signal output from the data synchronization means 108 based on a third synchronizing signal and outputs the resultant voice data signal as an eighth voice data signal.

The functions of other components are almost the same as those in the second embodiment except that the frequency division means 111 divides a basic synchronizing signal selected by the basic synchronizing signal selection means 110 to generate synchronizing signals and control signals and gives a first synchronizing signal to the count means 104, a second synchronizing signal and a third synchronizing signal to the data synchronization means 108, a serial control signal to the P/S data conversion means 109, and the third synchronizing signal (44.1/37.8 kHz) to the data interpolation means 114.

Next, a voice control method in the described voice control system of the embodiment will be discussed with reference to FIG. 3 and FIG. 11 to FIG. 14.

The voice control system of the third embodiment differs from that of the second embodiment previously described with reference to FIG. 2 in that data is interpolated in a cycle lower than the voice data sampling frequency for suppressing abrupt volume change by the data interpolation means 114.

Figure 13:
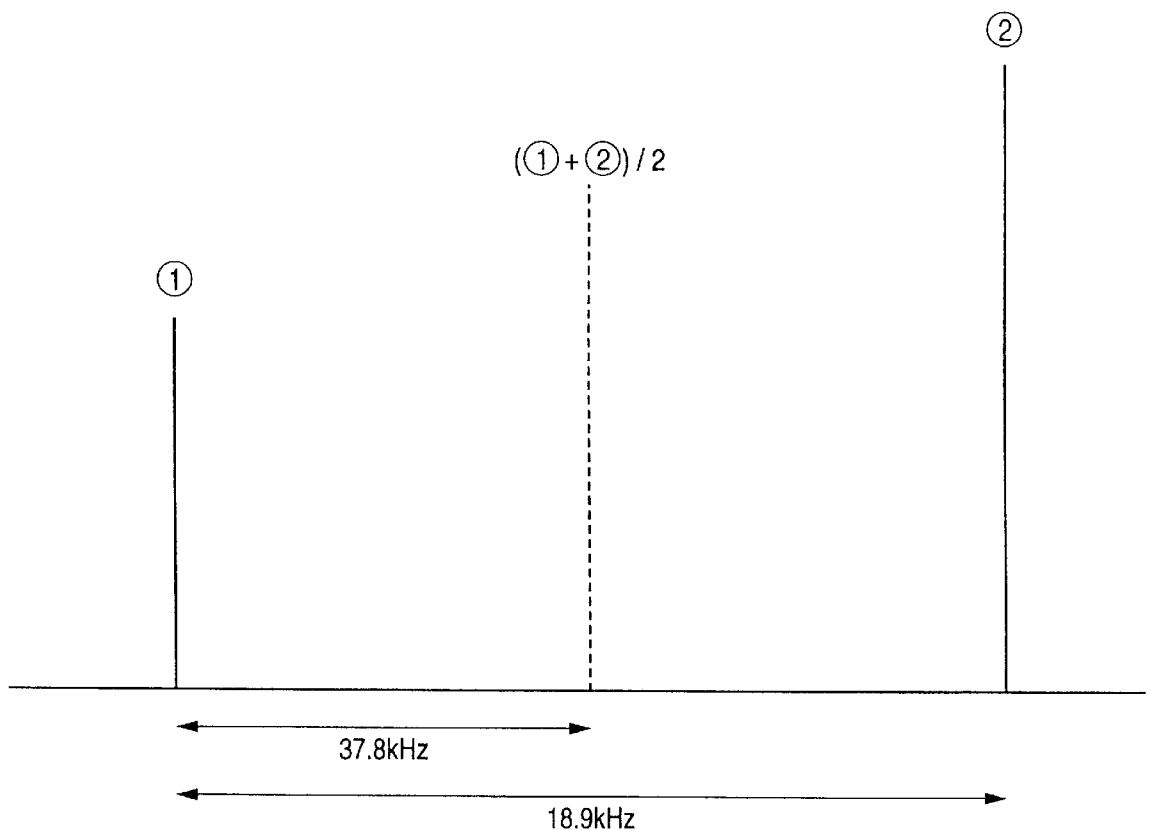
FIG. 13 is a characteristic chart to describe the operation of data interpolation means when voice data sampling frequency is 18.9 kHz in the third embodiment of the invention.

The operation of the components up to the data synchronization means 108 is the same as that of the second embodiment. To decode the voice data coded in the ADPCM on the CD-ROM XA standard, voice data sampled at sampling frequency 18.9 kHz is input to the data interpolation means 114. At this time, the data interpolation means 114 outputs the value (first input voice data (1) plus second input voice data (2)) divided by two as shown in FIG. 13 as an eighth voice data signal as shown in FIG. 11 in a cycle of the second synchronizing signal (37.8 kHz)

Figure 14:
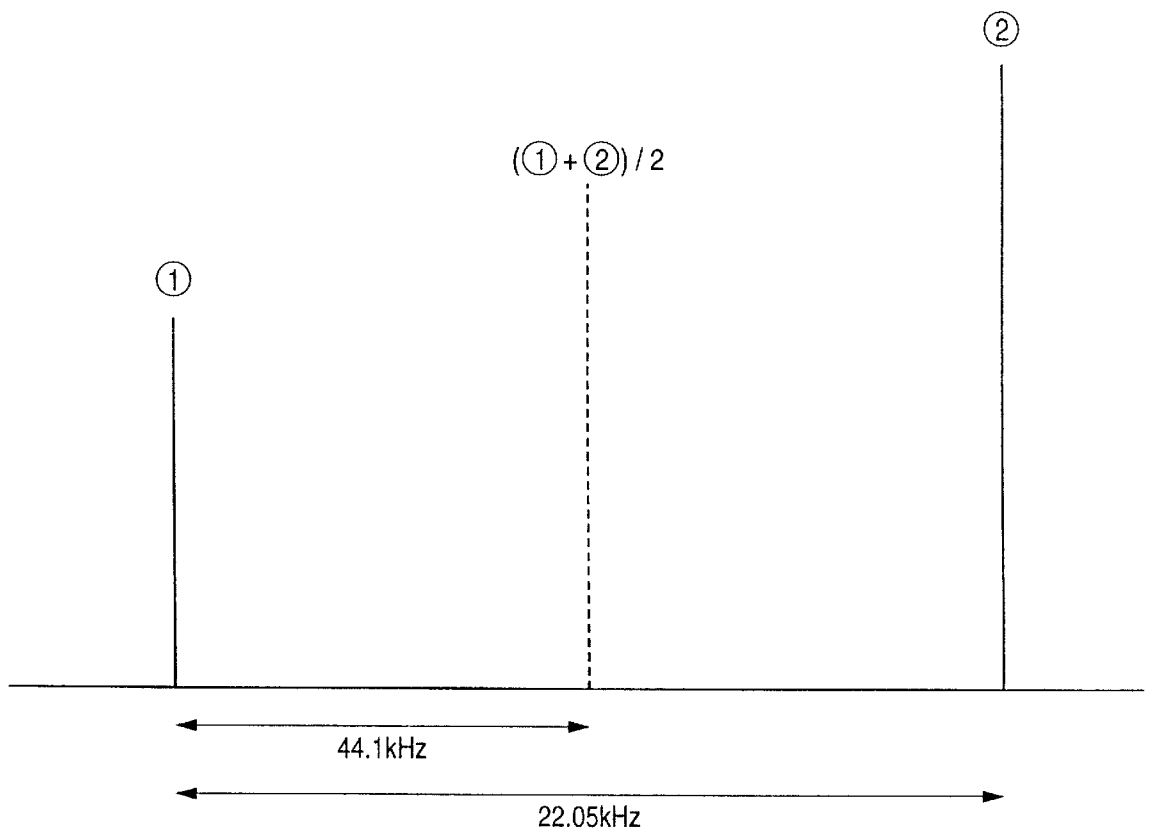
FIG. 14 is a characteristic chart to describe the operation of data interpolation means when voice data sampling frequency is 22.05 kHz in the third embodiment of the invention.

To decode the voice data coded in the ADPCM on the Navigation Research Association standard or in the PCM, voice data sampled at sampling frequency 22.05 kHz is input to the data interpolation means 114. At this time, the data interpolation means 114 outputs the value (first input voice data (1) plus second input voice data (2)) divided by two as shown in FIG. 14 as an eighth voice data signal as shown in FIG. 11 in a cycle of the third synchronizing signal (44.1 kHz).

The eighth voice data signal output from the data interpolation means 114 is converted into serial data by the P/S data conversion means 109 according to a serial control signal (2.8224 MHz), then output as an eleventh voice data signal as shown in FIG. 12. This eleventh voice data signal is output together with an LR control signal (88.2 kHz) and the serial control signal (2.8224 MHz) from the voice control system to a D/A converter.

Thus, according to the voice control system of the third embodiment shown in FIG. 3, the data interpolation means 114 interpolates data in a cycle lower than the sampling frequency of the voice data output from the data selection means 113, so that abrupt volume change can be suppressed regardless of which coding system the ADPCM on the CD-ROM XA standard, the ADPCM on the Navigation Research Association standard, or the PCM the voice data is coded in.

Fourth embodiment

Figure 4:
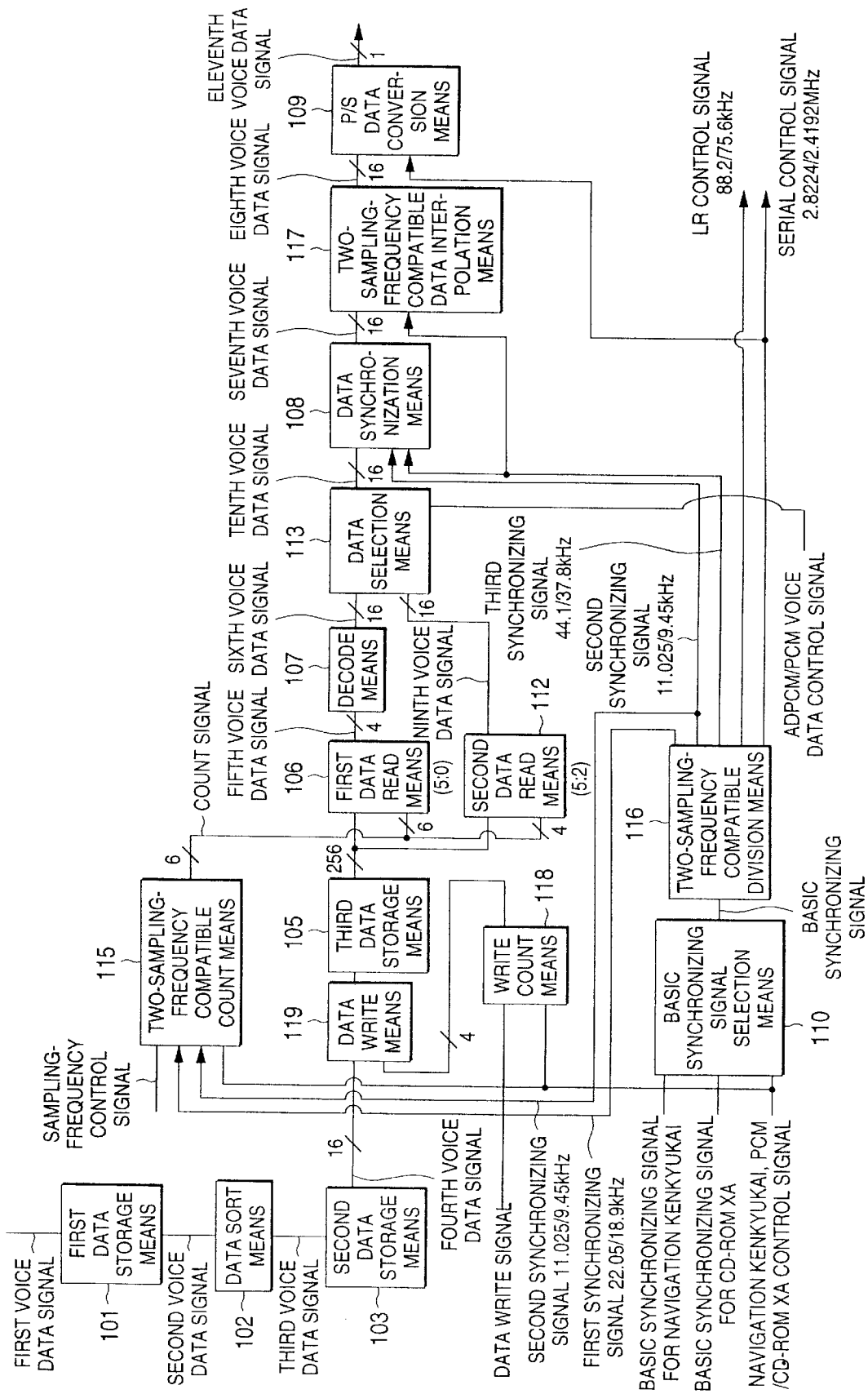
FIG. 4 is a block diagram of a voice control system according to a fourth embodiment of the invention.

FIG. 4 is a block diagram of a voice control system according to a fourth embodiment of the invention. Parts identical with or similar to those previously described with reference to FIG. 2 and FIG. 3 are denoted by the same reference numerals in FIG. 4. In FIG. 4, the voice control system of the fourth embodiment comprises first data storage means 101, data sort means 102, second data storage means 103, two-sampling-frequency compatible count means 115, third data storage means 105, write count means 118, data write means 119, first data read means 106, decode means 107, second data read means 112, data selection means 113, data synchronization means 108, two-sampling-frequency compatible data interpolation means 117, P/S data conversion means 109, basic synchronizing signal selection means 110, and two-sampling-frequency compatible frequency division means 116.

The voice control system of the fourth embodiment is provided by changing the count means 104 of the voice control system of the third embodiment to two-sampling-frequency compatible count means 115, the data interpolation means 114 to two-sampling-frequency compatible data interpolation means 117, and the frequency division means 111 to two-sampling-frequency compatible frequency division means 116.

The two-sampling-frequency compatible count means 115 changes a count cycle according to a voice data sampling frequency, namely, a sampling frequency control signal. Therefore, the first data read means 106 reads data from the third data storage means 105 according to a six-bit count signal from the two-sampling-frequency compatible count means 115. The second data read means 112 reads data from the third data storage means 105 according to the high-order four bits of a six-bit count signal from the two-sampling-frequency compatible count means 115.

The two-sampling-frequency compatible data interpolation means 117 interpolates a seventh voice data signal output from the data synchronization means 108; it is also adapted to handle voice data whose sampling frequency is 11.025/9.45 kHz.
[0084]
Further, the two-sampling-frequency compatible frequency division means 116 divides a basic synchronizing signal selected by the basic synchronizing signal selection means 110 to generate synchronizing signals and control signal and gives a first synchronizing signal (22.05/18.9 kHz) and a second synchronizing signal (11.025/9.45 kHz) to the two-sampling-frequency compatible count means 115, the second synchronizing signal and a third synchronizing signal (44.1/37.8 kHz) to the data synchronization means 108, the third synchronizing signal to the two-sampling-frequency compatible data interpolation means 117, and a serial control signal (2.8224/2.4192 MHz) to the P/S data conversion means 109. It also generates an LR control signal (88.2/75.6 kHz). The former frequency values enclosed in parentheses correspond to the ADPCM on the Navigation Research Association standard or the PCM and the latter frequency values correspond to the ADPCM on the CD-ROM XA standard.

Next, a voice control method in the described voice control system of the embodiment will be discussed with reference to FIG. 4 to FIG. 6, FIG. 15 to FIG. 20, FIG. 25, and FIG. 26.

First, to process stereo voice data coded in the ADPCM on the CD-ROM XA standard and sampled at frequency 18.9 kHz, the voice control system of the embodiment stores voice data stored in CD-ROM in the data storage means 2 in 128-byte units as shown in FIG. 5 as a first voice data signal.

The voice data on the CD-ROM XA standard is stored in CD-ROM in 128-byte units (16 bytes of parameter data plus 112 bytes of sound data), as shown in FIG. 5. Thus, the data sort means 102 sorts the voice data stored in the first data storage means 101 in the order of the circled numbers and the numbers prefixed by a circle in FIG. 5 and stores the voice data in the second data storage means 103 as shown in FIG. 26.

Next, the write count means 118 counts fourth voice data signal input in 16-bit units from the second data storage means 103 from 0 to 14 according to a data write signal based on a Navigation Research Association, PCM/CD-ROMXA control signal and the data write means 119 stores the data in the third data storage means 105 in the order of row (1), row (2), . . . row (15) as shown in FIG. 25.

The two-sampling-frequency compatible count means 115 counts from 0 to 59 as a count signal shown in FIG. 15 based on a second synchronizing signal (9.45 kHz) from the two-sampling-frequency compatible frequency division means 116 according to the Navigation Research Association, PCM/CD-ROM XA control signal. The first data read means 106 outputs the voice data stored in the third data storage means 105 as a fifth voice data signal as shown in FIG. 15 four bits at a time in the order of row (1) column I, row (1) column III, row (1) column II, row (1) column IV, row (2) column I, row (2) column III, row (2) column II, row (2) column IV, . . . row (15) column IV in FIG. 25 according to a count signal from the two-sampling-frequency compatible count means 115.

The range data, the filter data, and the sample data output from the third data storage means 105 are input to the decode means 107 and are decoded to 16-bit voice data based on the ADPCM on the CD-ROM XA or Navigation Research Association standard, then output as a sixth voice data signal as shown in FIG. 15.

Further, the data selection means 113 selects the sixth voice data signal according to the ADPCM/PCM voice data control signal and outputs the data signal as a tenth voice data signal, and the data synchronization means 108 synchronizes the voice data signal with a second synchronizing signal (9.45 kHz) and a third synchronizing signal (37.8 kHz) and outputs the data signal as a seventh voice data signal as shown in FIG. 15.

Figure 17:
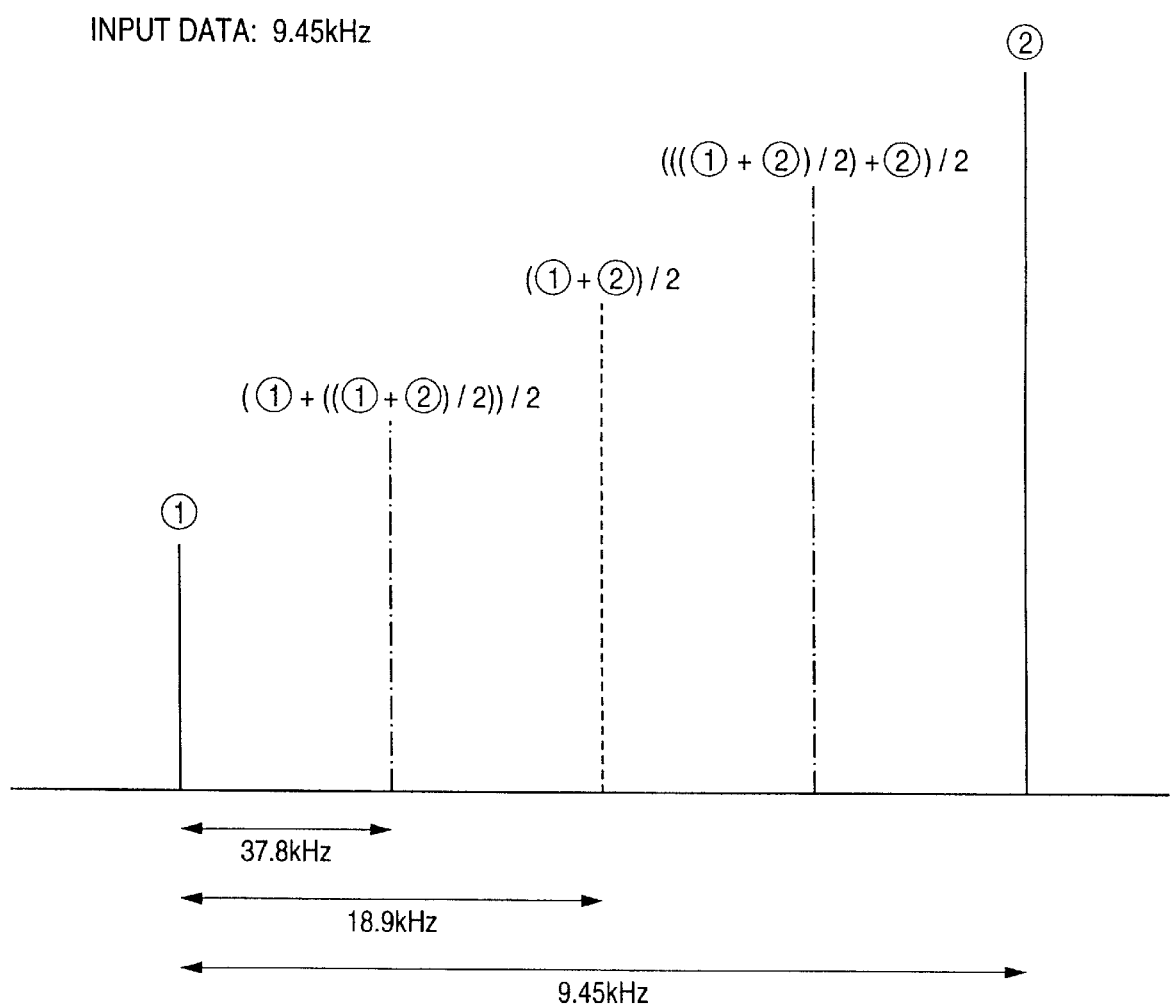
FIG. 17 is a characteristic chart to describe the operation of data interpolation means when voice data sampling frequency is 9.45 kHz in the fourth embodiment of the invention.

For the seventh voice data signal output from the data synchronization means 108, in the two-sampling-frequency compatible data interpolation means 117, the value (first input data (1) plus ((first input data (1) plus second input data (2)) divided by two)) divided by two as shown in FIG. 17 is output as an eighth voice data signal as shown in FIG. 15 in a cycle of the third synchronizing signal (37.8 kHz).

The eighth voice data signal output from the two-sampling-frequency compatible data interpolation means 117 is converted into serial data by the P/S data conversion means 109 according to a serial control signal (2.4192 MHz), then output as an eleventh voice data signal as shown in FIG. 16. This eleventh voice data signal is output together with an LR control signal (75.6 kHz) and the serial control signal (2.4192 MHz) from the voice control system to a D/A converter.

Next, for the voice control system of the embodiment to process monaural voice data coded in the PCM and sampled at frequency 11.025 kHz, the data sort means 102 does not sort the voice data and the write count means 118 counts from 0 to 15 according to a data write signal based on a Navigation Research Association, PCM/CD-ROM XA control signal. The data write means 119 stores the voice data input in 16-bit units from the second data storage means 103 in the third data storage means 105 in the order of row (1), row (2), . . . row (16) as shown in FIG. 6.

The two-sampling-frequency compatible count means 115 counts from 0 to 63 as a count signal shown in FIG. 19 based on a second synchronizing signal (11.025 kHz) from the two-sampling-frequency compatible frequency division means 116 according to the Navigation Research Association, PCM/CD-ROM XA control signal. The second data read means 112 outputs the voice data stored in the third data storage means 105 as a ninth voice data signal as shown in FIG. 9 16 bits at a time in the order of row (1), row (2), . . ., row (16) in FIG. 6 according to the high-order four bits of a six-bit count signal from the two-sampling-frequency compatible count means 115.

The voice data output from the third data storage means 105 is output as a tenth voice data signal because the data selection means 113 selects the ninth voice data signal according to the ADPCM/PCM voice data control signal. The data synchronization means 108 synchronizes the tenth voice data signal output from the data selection means 113 with a second synchronizing signal (11.025 kHz) and a third synchronizing signal (44.1 kHz) and outputs the data signal as a seventh voice data signal as shown in FIG. 19.

Figure 18:
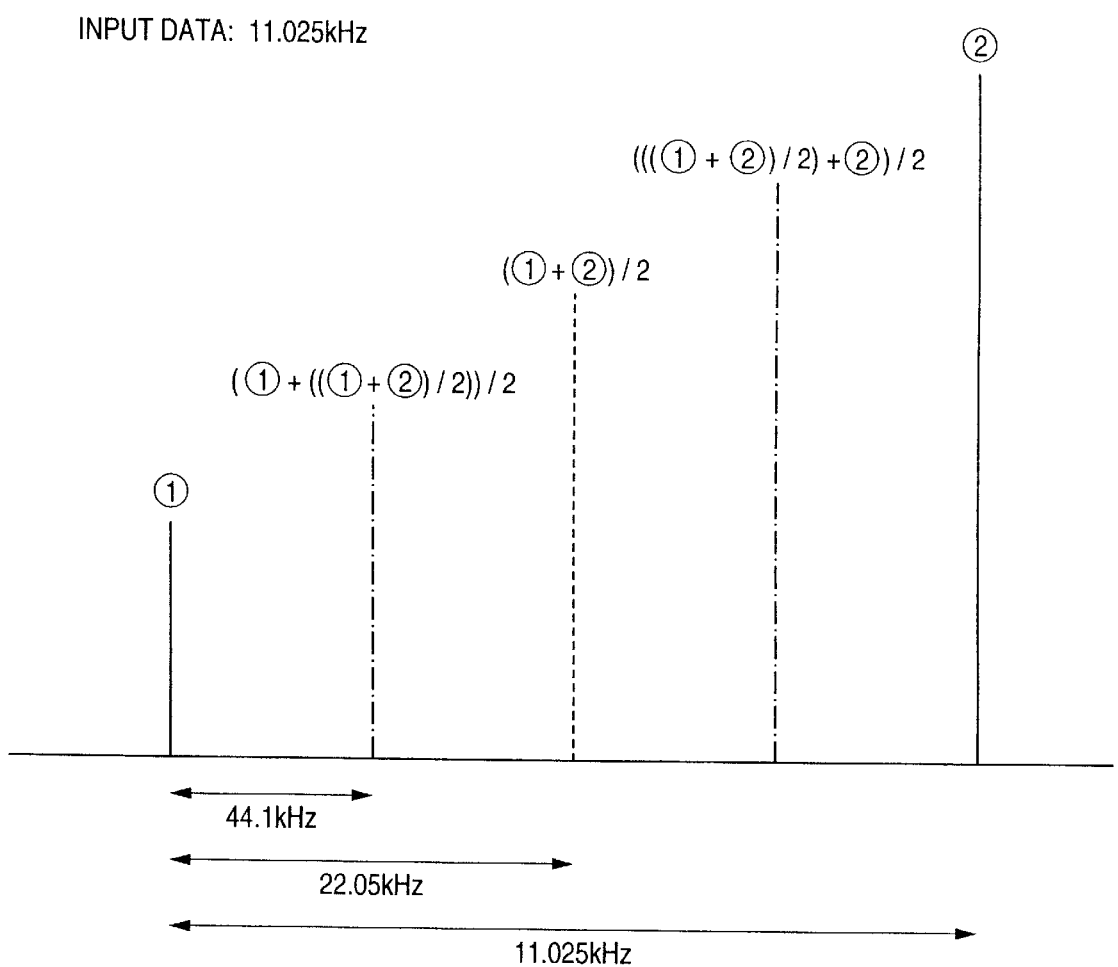
FIG. 18 is a characteristic chart to describe the operation of data interpolation means when voice data sampling frequency is 11.025 kHz in the fourth embodiment of the invention.

For the seventh voice data signal output from the data synchronization means 108, in the two-sampling-frequency compatible data interpolation means 117, the value (first input data (1) plus ((first input data (1) plus second input data (2)) divided by two)) divided by two as shown in FIG. 18 is output as an eighth voice data signal as shown in FIG. 19 in a cycle of the third synchronizing signal (44.1 kHz).

Further, the eighth voice data signal is converted into serial data as shown in FIG. 20 by the P/S data conversion means 109 according to a serial control signal (2.8228 MHz), then output as an eleventh voice data signal. This eleventh voice data signal is output together with an LR control signal (88.2 kHz) and the serial control signal (2.8228 MHz) from the voice control system to the D/A converter.

Thus, according to the voice control system of the fourth embodiment shown in FIG. 4, to process two-sampling-frequency ADPCM coded voice data on the CD-ROM XA or Navigation Research Association standard or PCM coded voice data, the data placement positions of the third data storage means 105 and the count read from the third data storage means 105 are changed depending on the ADPCM/PCM coding system difference, so that additional data storage means is not required and the minimum necessary circuit configuration or processing steps are only added, whereby the ADPCM coded voice data on the CD-ROM XA or Navigation Research association standard or the PCM coded voice data can be coded and transferred to a D/A converter. The data interpolation means 117 is made compatible with two sampling frequencies and the number of times the voice data output from the decode means 107 is interpolated is changed, whereby voice data can be reliably decoded and transferred to a D/A converter even when the input voice data is of a different sampling frequency.

Fifth embodiment

FIG. 27 is a block diagram to show the basic hardware configuration of a navigation system and navigation apparatus, which will be hereinafter collectively referred to as navigation system, according to a fifth embodiment of the invention. The navigation system of the embodiment is a car navigation system installed in a vehicle for providing a driver with his or her car location and optimum route information to the destination for improving time, energy efficiency and environmental friendliness.

In FIG. 27, the navigation system of the embodiment comprises a system control section 501, a communication control section 503, a GPS reception section 505, antennas 504 and 506, a vehicle information section 507, a speed sensor 509, a vibration gyroscope 511, a drawing and display control section 513, a monitor 514, a CD-ROM control section 515, CD-ROM 516, a voice control section 517, a loudspeaker 518, a voice recognition section 519, a microphone 520, a remote control section 521, and a remote control terminal 522.

The communication control section 503, the GPS reception section 505, the antennas 504 and 506, the vehicle information section 507, the speed sensor 509, and the vibration gyroscope 511 makeup a sensing interface. Although GPS (global positioning system) is used as a sensor for determining the car location, speed, and azimuth, an autonomous navigation system of the speed sensor 509 and the vibration gyroscope 511 is contained as a hybrid for interpolation under circumstances where information from a satellite is hard to receive or correcting an error mutually by the sensors for improving accuracy. The communication control section 503 controls reception of traffic jam information, etc., from VICS (vehicle information & communication system) and the vehicle information section 507 detects a vehicle condition (right turn, back, parking, etc.,).

The drawing and display control section 513, the CD-ROM control section 515, the voice control section 517, the voice recognition section 519, and the remote control section 521 make up a peripheral equipment control section. The monitor 514, the CD-ROM 516, the loudspeaker 518, the microphone 520, and the remote control terminal 522 make up a user control interface section.

Further, the system control section 501 performs mapping processing for identifying the position on the road where the car is running based on car location information from the sensor and map data from the CD-ROM 516 and calculates an optimum route based on traffic jam information from the communication control section 503, the above-mentioned on-road position data, and user-setup destination information from the remote control section 521, then guides the car on the optimum route.

The navigation system of the embodiment is characterized by the voice control section 517 and the voice control system described in the first to fourth embodiments and a D/A converter are added to the navigation system, whereby the voice data coded in a different coding system on a different standard such as the ADPCM on the Navigation Research Association or CD-ROM XA standard or the PCM and recorded in the CD-ROM 516 can be decoded and transferred to the D/A converter by adding the minimum necessary circuit configuration or processing steps, namely, by circuit change or routine change on a small scale, contributing to reduction in the costs of the navigation system and miniaturization thereof.

As described above, according to the invention, to decode the voice data coded in a coding system on a specific standard, the voice data is previously sorted by the data sort means (or data sort step), then decoding, synchronizing with a synchronizing signal, and conversion to serial data are performed, and the resultant data is transferred to the D/A converter, so that the minimum necessary circuit configuration or steps are only added to the processing routine or circuit configuration dedicated to the voice data coded in a coding system on a different standard, whereby the voice data coded in coding systems on different standards can be decoded and transferred to the D/A converter. Resultantly, an excellent voice control system, an excellent voice control method, a voice control method recording medium, a navigation system using the system, method, or recording medium, a navigation apparatus using the voice control system, and a vehicle installing the navigation apparatus can be provided. Since the voice control system, voice control method, or voice control method recording medium can be provided by circuit change or processing routine change on a small scale, the invention can contribute to reduction in the costs of the navigation system, navigation apparatus, and vehicle and miniaturization thereof.

According to the invention, to decode the voice data coded in a coding system on a specific standard, the voice data is previously sorted by the data sort means (or data sort step), the first and second data read means (first and second data read steps) are provided for reading voice data from the data storage means according to different counts corresponding to the coding systems, the voice data from the first data read means (first data read step) is decoded, and the decoded voice data or the voice data from the second data read means (second data read step) is selected, then synchronizing with a synchronizing signal and conversion to serial data are performed, and the resultant data is transferred to the D/A converter, thus the minimum necessary circuit configuration or steps are only added to the processing routine or circuit configuration dedicated to the voice data coded in a coding system on a different standard without the need for additional data storage means, etc., so that the voice data coded in different coding systems on different standards can be decoded and transferred to the D/A converter. Resultantly, an excellent voice control system, an excellent voice control method, a voice control method recording medium, a navigation system using the system, method, or recording medium, a navigation apparatus using the voice control system, and a vehicle installing the navigation apparatus can be provided. Since the voice control system, voice control method, or voice control method recording medium can be provided by circuit change or processing routine change on a small scale, the invention can contribute to reduction in the costs of the navigation system, navigation apparatus, and vehicle and miniaturization thereof.

According to the invention, the data interpolation means (data interpolation step) interpolates the voice data output from the data synchronization means in a cycle lower than the sampling frequency of the voice data, thus abrupt volume change can be suppressed for the voice data coded in different coding systems.

Further, according to the invention, the synchronizing signal cycle in which the count means (count step) counts based on the synchronizing signal given from the frequency division means is changed and the number of times the data interpolation means (data interpolation step) interpolates the voice data output from the decode means (decode step) is changed, whereby voice data can be reliably decoded and transferred to the D/A converter even when the input voice data is of a different sampling frequency.

What is claimed is:

1. A voice control system comprising:

first data storage means for temporarily storing input voice data;

data sort means for sorting the voice data stored in said first data storage means if the input voice data is coded in a coding system on a specific standard;

second data storage means for temporarily storing the voice data sorted by said data sort means;

count means for counting a value in a predetermined cycle responsive to the input voice data;

third data storage means for temporarily storing the voice data output from said second data storage means;

write count means for counting according to a data write signal;

data write means for writing the voice data output from said second data storage means into said third data storage means according to a count output from said write count means;

data read means for reading the voice data from said third data storage means according to a count output from said count means;

decode means for decoding voice data output from said data read means;

data synchronization means for outputting the voice data output from said decode means in synchronization with a synchronizing signal;

parallel/serial data conversion means for converting the voice data output from said data synchronization means from parallel data into serial data;

basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data; and frequency division means for dividing the basic synchronizing signal output from said basic synchronizing signal selection means to generate synchronizing signals to be given to said count means, said data synchronization means, and said parallel/serial data conversion means.

2. A voice control system comprising:

first data storage means for temporarily storing input voice data;

data sort means for sorting the voice data stored in said first data storage means if the input voice data is coded in a coding system on a specific standard;

second data storage means for temporarily storing the voice data sorted by said data sort means;

count means for counting a value in a predetermined cycle responsive to the input voice data;

third data storage means for temporarily storing the voice data output from said second data storage means;

write count means for counting according to a data write signal;

data write means for writing the voice data output from said second data storage means into said third data storage means according to a count output from said write count means;

first data read means for reading the voice data from said third data storage means according to a count output from said count means;

second data read means for reading voice data from said third data storage means according to a different count from that for said first data read means;

decode means for decoding voice data output from said first data read means;

data selection means for selecting voice data output by said decode means or voice data output by said second data read means according to a control signal;

data synchronization means for outputting the voice data output from said data selection means in synchronization with a synchronizing signal;

parallel/serial data conversion means for converting the voice data output from said data synchronization means from parallel data into serial data;

basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data; and frequency division means for dividing the basic synchronizing signal output from said basic synchronizing signal selection means to generate synchronizing signals to be given to said count means, said data synchronization means, and said parallel/serial data conversion means.

3. The voice control system as claimed in claim 1 or 2 further including data interpolation means for interpolating the voice data output from said data synchronization means.

4. The voice control system as claimed in claim 3 wherein when the input voice data is of a different sampling frequency, the synchronizing signal cycle in which said count means counts based on the synchronizing signal given from said frequency division means is changed and the number of times said data interpolation means interpolates the voice data output from said decode means is changed.

5. The voice control system as claimed in claim 1 or 2, wherein said data sort means sorts the voice data stored in said first data storage means only if the input voice data is voice data coded in the coding system on the specific standard, and said data sort means outputs the voice data stored in said first data storage means as it is without sorting if the input voice data is voice data coded in a coding system on another standard different from the coding system on the specific standard.

6. A voice control method comprising:

a data sort step of sorting input voice data if the input voice data is coded in a coding system on a specific standard;

a data write step of writing the voice data sorted by said data sort step into data storage means according to a count based on a predetermined write timing;

a count step of counting a value in a predetermined cycle responsive to the input voice data;

a data read step of reading the voice data from the data storage means according to a count output from said count step; and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by said data read step is decoded, that the decoded voice data is synchronized with the synchronizing signal selected by said basic synchronizing signal selection step, and that the voice data is converted from synchronous parallel data into serial data.

7. A voice control method comprising:

a data sort step of sorting input voice data if the input voice data is coded in a coding system on a specific standard;

a data write step of writing the voice data sorted by said data sort step into data storage means according to a count based on a predetermined write timing;

a count step of counting a value in a predetermined cycle responsive to the input voice data;

a first data read step of reading the voice data from the data storage means according to a count output from said count step;

a second data read step of reading voice data from the data storage means according to a different count from that for said first data read step; and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by said first data read step is decoded, that the decoded voice data or the voice data read by said second data read step is selected, that the selected voice data is synchronized with the synchronizing signal selected by said basic synchronizing signal selection step, and that the voice data is converted from synchronous parallel data into serial data.

8. The voice control method as claimed in claim 6 or 7 further including a data interpolation step of interpolating the voice data synchronized by said data synchronization step.

9. The voice control method as claimed in claim 8 wherein when the input voice data is of a different sampling frequency, the count cycle in said count step is changed and the number of times the decoded voice data is interpolated is changed for interpolating the data.

10. The voice control method as claimed in claim 6 or 7, wherein said data sort step sorts the voice data only if the input voice data is voice data coded in the coding system on the specific standard, and said data sort step does not sort the voice data if the input voice data is voice data coded in a coding system on another standard different from the coding system on the specific standard.

11. A computer-readable recording medium recording a program for instructing a computer to execute the voice control method as claimed in claim 6 or 7.

12. A navigation system using a computer-readable recording medium recording a program for instructing a computer to execute the voice control method as claimed in claim 6 or 7.

13. A navigation system using a voice control system comprising first data storage means for temporarily storing input voice data, data sort means for sorting the voice data stored in said first data storage means if the input voice data is coded in a coding system on a specific standard, second data storage means for temporarily storing the voice data sorted by said data sort means, count means for counting a value in a predetermined cycle responsive to the input voice data, third data storage means for temporarily storing the voice data output from said second data storage means, write count means for counting according to a data write signal, data write means for writing the voice data output from said second data storage means into said third data storage means according to a count output from said write count means, data read means for reading the voice data from said third data storage means according to a count output from said count means, decode means for decoding voice data output from said data read means, data synchronization means for outputting the voice data output from said decode means in synchronization with a synchronizing signal, parallel/serial data conversion means for converting the voice data output from said data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from said basic synchronizing signal selection means to generate synchronizing signals to be given to said count means, said data synchronization means, and said parallel/serial data conversion means.

14. A navigation system using a voice control system comprising first data storage means for temporarily storing input voice data, data sort means for sorting the voice data stored in said first data storage means if the input voice data is coded in a coding system on a specific standard, second data storage means for temporarily storing the voice data sorted by said data sort means, count means for counting a value in a predetermined cycle responsive to the input voice data, third data storage means for temporarily storing the voice data output from said second data storage means, write count means for counting according to a data write signal, data write means for writing the voice data output from said second data storage means into said third data storage means according to a count output from said write count means, first data read means for reading the voice data from said third data storage means according to a count output from said count means, second data read means for reading voice data from said third data storage means according to a different count from that for said first data read means, decode means for decoding voice data output from said first data read means, data selection means for selecting voice data output by said decode means or voice data output by said second data read means according to a control signal, data synchronization means for outputting the voice data output from said data selection means in synchronization with a synchronizing signal, parallel/serial data conversion means for converting the voice data output from said data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from said basic synchronizing signal selection means to generate synchronizing signals to be given to said count means, said data synchronization means, and said parallel/serial data conversion means.

15. The navigation system as claimed in claim 12 or 14 wherein said voice control system further includes data interpolation means for interpolating the voice data output from said data synchronization means.

16. The navigation system as claimed in claim 15 wherein when the input voice data is of a different sampling frequency, the synchronizing signal cycle in which said count means counts based on the synchronizing signal given from said frequency division means is changed and the number of times said data interpolation means interpolates the voice data output from said decode means is changed.

17. A navigation system using a voice control method comprising a data sort step of sorting input voice data if the input voice data is coded in a coding system on a specific standard, a data write step of writing the voice data sorted by said data sort step into data storage means according to a count based on a predetermined write timing, a count step of counting a value in a predetermined cycle responsive to the input voice data, a data read step of reading the voice data from the data storage means according to a count output from said count step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by said data read step is decoded, that the decoded voice data is synchronized with the synchronizing signal selected by said basic synchronizing signal selection step, and that the voice data is converted from synchronous parallel data into serial data.

18. A navigation system using a voice control method comprising a data sort step of sorting input voice data if the input voice data is coded in a coding system on a specific standard, a data write step of writing the voice data sorted by said data sort step into data storage means according to a count based on a predetermined write timing, a count step of counting a value in a predetermined cycle responsive to the input voice data, a first data read step of reading the voice data from the data storage means according to a count output from said count step, a second data read step of reading voice data from the data storage means according to a different count from that for said first data read step, and a basic synchronizing signal selection step of selecting a first basic synchronizing signal required for decoding the voice data coded in the coding system on the specific standard or a second basic synchronizing signal required for decoding voice data coded in a coding system on another standard different from the coding system on the specific standard in response to the input voice data, characterized in that the voice data read by said first data read step is decoded, that the decoded voice data or the voice data read by said second data read step is selected, that the selected voice data is synchronized with the synchronizing signal selected by said basic synchronizing signal selection step, and that the voice data is converted from synchronous parallel data into serial data.

19. The navigation system as claimed in claim 17 or 18 wherein said voice control method further includes a data interpolation step of interpolating the voice data synchronized by said data synchronization step.

20. The navigation system as claimed in claim 19 wherein when the input voice data is of a different sampling frequency, the count cycle in said count step is changed and the number of times the decoded voice data is interpolated is changed for interpolating the data.

21. A navigation apparatus using a voice control system comprising first data storage means for temporarily storing input voice data, data sort means for sorting the voice data stored in said first data storage means if the input voice data is coded in a coding system on a specific standard, second data storage means for temporarily storing the voice data sorted by said data sort means, count means for counting a value in a predetermined cycle responsive to the input voice data, third data storage means for temporarily storing the voice data output from said second data storage means, write count means for counting according to a data write signal, data write means for writing the voice data output from said second data storage means into said third data storage means according to a count output from said write count means, data read means for reading the voice data from said third data storage means according to a count output from said count means, decode means for decoding voice data output from said data read means, data synchronization means for outputting the voice data output from said decode means in synchronization with a synchronizing signal, parallel/serial data conversion means for converting the voice data output from said data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from said basic synchronizing signal selection means to generate synchronizing signals to be given to said count means, said data synchronization means, and said parallel/serial data conversion means.

22. A navigation apparatus using a voice control system comprising first data storage means for temporarily storing input voice data, data sort means for sorting the voice data stored in said first data storage means if the input voice data is coded in a coding system on a specific standard, second data storage means for temporarily storing the voice data sorted by said data sort means, count means for counting a value in a predetermined cycle responsive to the input voice data, third data storage means for temporarily storing the voice data output from said second data storage means, write count means for counting according to a data write signal, data write means for writing the voice data output from said second data storage means into said third data storage means according to a count output from said write count means, first data read means for reading the voice data from said third data storage means according to a count output from said count means, second data read means for reading voice data from said third data storage means according to a different count from that for said first data read means, decode means for decoding voice data output from said first data read means, data selection means for selecting voice data output by said decode means or voice data output by said second data read means according to a control signal, data synchronization means for outputting the voice data output from said data selection means in synchronization with a synchronizing signal, parallel/serial data conversion means for converting the voice data output from said data synchronization means from parallel data into serial data, basic synchronizing signal selection means for selecting a first basic synchronizing signal required for decoding the voice data coded in the coding system on the specific standard or a second basic synchronizing signal required for decoding voice data coded in a coding system on another standard different from the coding system on the specific standard in response to the input voice data, and frequency division means for dividing the basic synchronizing signal output from said basic synchronizing signal selection means to generate synchronizing signals to be given to said count means, said data synchronization means, and said parallel/serial data conversion means.

23. The navigation apparatus as claimed in claim 21 or 22 wherein said voice control system further includes data interpolation means for interpolating the voice data output from said data synchronization means.

24. The navigation apparatus as claimed in claim 23 wherein when the input voice data is of a different sampling frequency, the synchronizing signal cycle in which said count means counts based on the synchronizing signal given from said frequency division means is changed and the number of times said data interpolation means interpolates the voice data output from said decode means is changed.

25. A vehicle installing the navigation apparatus as claimed in claim 21 or 22.

* * * * *